United States Patent
O'Shaughnessy et al.

(10) Patent No.: US 11,033,147 B2
(45) Date of Patent: Jun. 15, 2021

(54) GAS TANK GUARD IN GRILL CART

(71) Applicant: OHC IP Holdings, LLC, Eden Prairie, MN (US)

(72) Inventors: Michael L. O'Shaughnessy, Edina, MN (US); James A. Mitlyng, Minneapolis, MN (US); Thomas E. Mckinney, Minnetonka, MN (US)

(73) Assignee: OHC IP Holdings, LLC, Eden Prairie, MN (US)

( * ) Notice: Subject to any disclaimer, the term of this patent is extended or adjusted under 35 U.S.C. 154(b) by 55 days.

(21) Appl. No.: 16/450,493

(22) Filed: Jun. 24, 2019

(65) Prior Publication Data
US 2020/0000279 A1    Jan. 2, 2020

Related U.S. Application Data

(60) Provisional application No. 62/690,700, filed on Jun. 27, 2018.

(51) Int. Cl.
*A47J 37/07*     (2006.01)
*B65D 85/64*     (2006.01)

(52) U.S. Cl.
CPC ....... *A47J 37/0713* (2013.01); *A47J 37/0786* (2013.01); *B65D 85/64* (2013.01);
(Continued)

(58) Field of Classification Search
CPC .................. A47J 2037/0777; A47J 37/0786
See application file for complete search history.

(56) References Cited

U.S. PATENT DOCUMENTS 3,802,413 A    4/1974  Pepin
4,211,206 A    7/1980  Darbo
(Continued)

FOREIGN PATENT DOCUMENTS

CN    201005546    1/2008
CN    202801180    3/2013
(Continued)

OTHER PUBLICATIONS

"Char-Broil Modular Outdoor Kitchen," Char Broil webpage Apr. 29, 2019, retrieved on Aug. 8, 2019, https://www.charbroil.com/grills/outdoor-kitchens/modular-outdoor-kitchen (4 pages).
(Continued)

*Primary Examiner* — David J Laux
(74) *Attorney, Agent, or Firm* — Pauly, DeVries Smith & Deffner LLC

(57) ABSTRACT

In an embodiment a grill system is provided. The grill system can include a grill assembly. The grill assembly can include a grill cart, a burner box, and a gas tank guard coupled to the grill cart. The burner box is coupled to a top portion of the grill cart. The grill cart is transtionable between a folded state and an upright state. The interior volume of the grill cart is greater when the grill cart is in the upright state than when the grill cart is in the folded state. The gas tank guard is configured to prevent two or more gas tanks from being placed within the interior volume of the grill cart when the grill cart is in the upright state. The gas tank guard is coupled to the grill cart in both the folded state and the upright state. Other embodiments are also included herein.

15 Claims, 18 Drawing Sheets

(52) U.S. Cl.
CPC . *A47J 2037/0777* (2013.01); *B65D 2585/649* (2013.01); *B65D 2585/6815* (2013.01)

(56) References Cited

U.S. PATENT DOCUMENTS

| | | | |
|---|---|---|---|
| 4,569,327 A | 2/1986 | Velten | |
| 4,577,772 A * | 3/1986 | Bigliardi | B65D 88/121 |
| | | | 220/1.5 |
| 4,887,836 A | 12/1989 | Simjian | |
| 4,949,701 A | 8/1990 | Krosp et al. | |
| 4,984,515 A | 1/1991 | Pivonka | |
| 5,040,809 A | 8/1991 | Yang | |
| 5,050,731 A | 9/1991 | Baynes et al. | |
| 5,065,734 A | 11/1991 | Elliott | |
| 5,261,550 A | 11/1993 | Karpisek | |
| 5,318,322 A * | 6/1994 | Home | A47J 37/0713 |
| | | | 126/9 R |
| 5,462,318 A | 10/1995 | Cooke | |
| 5,579,755 A | 12/1996 | Johnston | |
| 5,884,554 A | 3/1999 | Sprick | |
| 6,026,751 A | 2/2000 | Tsai | |
| 6,039,039 A | 3/2000 | Pina, Jr. | |
| 6,316,837 B1 | 11/2001 | Song | |
| 6,401,953 B2 | 6/2002 | Kofod | |
| 6,439,111 B1 | 8/2002 | Lu | |
| 6,439,220 B1 | 8/2002 | Johnson | |
| 6,439,221 B1 | 8/2002 | Ward et al. | |
| 6,494,419 B2 | 12/2002 | Pai | |
| 6,532,951 B1 | 3/2003 | Sallie et al. | |
| 6,606,986 B2 | 8/2003 | Holland et al. | |
| 6,619,600 B1 * | 9/2003 | Johnson | A47J 37/0704 |
| | | | 126/25 R |
| D485,467 S | 1/2004 | Pai | |
| D491,414 S | 6/2004 | Nichols et al. | |
| 6,792,880 B2 | 9/2004 | Tsai | |
| 6,823,858 B1 | 11/2004 | Chen | |
| 6,916,028 B2 | 7/2005 | Shapiro | |
| 7,080,640 B2 | 7/2006 | Sanders et al. | |
| D533,011 S | 12/2006 | Pai | |
| D541,576 S | 5/2007 | Lutz | |
| D546,616 S | 7/2007 | Tseng | |
| D546,624 S | 7/2007 | Pai | |
| D547,108 S | 7/2007 | Tseng | |
| D547,109 S | 7/2007 | Tseng | |
| D549,035 S | 8/2007 | Chung | |
| 7,360,783 B2 | 4/2008 | Home | |
| D615,799 S | 5/2010 | Best et al. | |
| D618,951 S | 7/2010 | Tzeng | |
| 7,753,047 B1 | 7/2010 | Trammell | |
| 7,856,924 B1 * | 12/2010 | Stihi | A47J 37/0731 |
| | | | 99/419 |
| 8,042,829 B2 * | 10/2011 | Hailston | B62B 3/022 |
| | | | 280/655.1 |
| 8,316,837 B2 | 11/2012 | Malumyan | |
| 8,347,874 B2 * | 1/2013 | Bruno | A47J 37/0713 |
| | | | 126/41 R |
| 8,479,928 B2 | 7/2013 | Tanabe et al. | |
| 8,522,769 B2 * | 9/2013 | Ducate, Jr. | A47J 37/0786 |
| | | | 126/25 R |
| 8,602,017 B2 * | 12/2013 | May | A47J 37/0704 |
| | | | 126/9 R |
| RE44,770 E | 2/2014 | Nichols et al. | |
| 8,839,780 B1 * | 9/2014 | Bennett | G05B 19/41815 |
| | | | 126/25 R |
| D737,096 S | 8/2015 | Lee et al. | |
| 9,187,108 B2 | 11/2015 | Bruno et al. | |
| 9,211,036 B2 | 12/2015 | May et al. | |
| 9,316,401 B1 | 4/2016 | Guste | |
| 9,392,904 B2 * | 7/2016 | Garman | A47J 37/0763 |
| D798,645 S | 10/2017 | Lira-Nunez et al. | |
| 9,783,216 B2 * | 10/2017 | Alden | B62B 1/12 |
| 9,788,690 B2 * | 10/2017 | Rosian | A47J 37/0786 |
| 9,817,108 B2 | 11/2017 | Kuo et al. | |
| D805,332 S | 12/2017 | Price et al. | |
| D805,819 S | 12/2017 | Price et al. | |
| D820,010 S | 6/2018 | Reyes | |
| 10,689,018 B2 | 6/2020 | Patton et al. | |
| 10,702,099 B2 * | 7/2020 | O'Shaughnessy | A47J 37/0713 |
| 10,772,466 B2 * | 9/2020 | O'Shaughnessy | A47J 37/0786 |
| D899,176 S | 10/2020 | Lien | |
| 10,966,569 B2 | 4/2021 | O'Shaughnessy et al. | |
| 2001/0015137 A1 | 8/2001 | Ogrady et al. | |
| 2004/0020482 A1 | 2/2004 | Chen | |
| 2004/0065313 A1 | 4/2004 | Thompson | |
| 2006/0049725 A1 | 3/2006 | Simon | |
| 2006/0225725 A1 | 10/2006 | Rinaldo | |
| 2007/0089724 A1 * | 4/2007 | Home | A47J 37/0704 |
| | | | 126/9 R |
| 2007/0152414 A1 | 7/2007 | Home | |
| 2008/0066730 A1 * | 3/2008 | Ducate | F24C 3/14 |
| | | | 126/42 |
| 2008/0245357 A1 * | 10/2008 | Meether | A47J 37/0786 |
| | | | 126/25 R |
| 2010/0031950 A1 | 2/2010 | Paslawski | |
| 2010/0269814 A1 * | 10/2010 | May | A47J 37/0704 |
| | | | 126/25 R |
| 2010/0326938 A1 * | 12/2010 | Zhu | A47F 5/10 |
| | | | 211/149 |
| 2011/0025005 A1 | 2/2011 | Howell | |
| 2011/0041831 A1 | 2/2011 | Dettloff | |
| 2011/0168155 A1 | 7/2011 | Gallo | |
| 2011/0168168 A1 | 7/2011 | Schneider | |
| 2011/0168593 A1 | 7/2011 | Neufeld et al. | |
| 2012/0012091 A1 | 1/2012 | Home | |
| 2012/0017890 A1 | 1/2012 | May et al. | |
| 2013/0049311 A1 | 2/2013 | Metters et al. | |
| 2013/0112088 A1 | 5/2013 | May | |
| 2013/0312732 A1 * | 11/2013 | Brennan | A47J 37/0713 |
| | | | 126/25 R |
| 2014/0069412 A1 | 3/2014 | Garman | |
| 2014/0090635 A1 | 4/2014 | May | |
| 2014/0165992 A1 | 6/2014 | May et al. | |
| 2014/0261394 A1 | 9/2014 | Evans et al. | |
| 2015/0013667 A1 | 1/2015 | Ho et al. | |
| 2015/0020796 A1 * | 1/2015 | Garman | A47J 37/0704 |
| | | | 126/9 B |
| 2015/0118006 A1 | 4/2015 | Wallace-riley | |
| 2016/0305172 A1 | 10/2016 | Grisendi | |
| 2017/0085114 A1 | 3/2017 | Gao et al. | |
| 2017/0095114 A1 | 4/2017 | O'shaughnessy et al. | |
| 2017/0143162 A1 * | 5/2017 | Olsen | A47J 37/07 |
| 2017/0159941 A1 | 6/2017 | Kahler et al. | |
| 2018/0008095 A1 * | 1/2018 | Bennett | A47J 37/0786 |
| 2018/0132660 A1 * | 5/2018 | Suchevits | A23B 4/052 |
| 2018/0141576 A1 * | 5/2018 | Leffler | B62B 5/0063 |
| 2018/0280677 A1 | 10/2018 | Knight | |
| 2018/0290677 A1 | 10/2018 | Patton et al. | |
| 2018/0310765 A1 * | 11/2018 | May | A47J 37/0704 |
| 2019/0380533 A1 | 12/2019 | Lien | |
| 2020/0000277 A1 | 1/2020 | O'Shaughnessy et al. | |
| 2020/0000278 A1 | 1/2020 | O'Shaughnessy et al. | |
| 2020/0000280 A1 | 1/2020 | O'Shaughnessy et al. | |
| 2020/0000281 A1 | 1/2020 | O'Shaughnessy et al. | |
| 2020/0000283 A1 | 1/2020 | O'Shaughnessy et al. | |
| 2020/0390279 A1 | 12/2020 | O'Shaughnessy et al. | |
| 2020/0391779 A1 | 12/2020 | Patton et al. | |
| 2021/0045579 A1 | 2/2021 | O'Shaughnessy et al. | |

FOREIGN PATENT DOCUMENTS

| | | |
|---|---|---|
| CN | 202807780 | 3/2013 |
| CN | 104234616 | 12/2014 |
| CN | 204618011 | 9/2015 |
| CN | 205632566 | 10/2016 |
| CN | 107198467 | 9/2017 |
| JP | 2006223643 | 8/2006 |
| KR | 200173343 | 4/2000 |
| KR | 20050102437 | 10/2005 |
| KR | 20130000879 | 2/2013 |
| TW | 309958 | 7/1997 |
| WO | 2004054415 | 7/2004 |
| WO | 2004072539 | 8/2004 |

(56) References Cited

FOREIGN PATENT DOCUMENTS

| WO | 2015089551 | 6/2015 |
|---|---|---|
| WO | 2016149408 | 11/2016 |
| WO | 2017095746 | 6/2017 |
| WO | 2017160338 | 9/2017 |
| WO | 2018183373 | 10/2018 |
| WO | 2020005946 | 1/2020 |
| WO | 2020005969 | 1/2020 |
| WO | 2020005972 | 1/2020 |
| WO | 2020005976 | 1/2020 |
| WO | 2020005978 | 1/2020 |
| WO | 2020005981 | 1/2020 |

OTHER PUBLICATIONS

"Danver's Post and Panel System," Danver webpage Jun. 1, 2018, retrieved on Aug. 8, 2019, https://danver.com/blog/post-and-panel-system/ (2 pages).
"Final Office Action," for U.S. Appl. No. 15/262,733 dated Sep. 5, 2019 (14 pages).
"International Preliminary Report on Patentability," for PCT Application No. PCT/US2018/024628 dated Oct. 10, 2019 (13 pages).
"International Search Report and Written Opinion," for PCT Application No. PCT/US2019/038993 dated Oct. 15, 2019 (13 pages).
"International Search Report and Written Opinion," for PCT Application No. PCT/US2019/039024 dated Oct. 15, 2019 (14 pages).
"International Search Report and Written Opinion," for PCT Application No. PCT/US2019/039027 dated Oct. 15, 2019 (13 pages).
"International Search Report and Written Opinion," for PCT Application No. PCT/US2019/039034 dated Oct. 15, 2019 (12 pages).
"International Search Report and Written Opinion," for PCT Application No. PCT/US2019/039039 dated Oct. 16, 2019 (14 pages).
"International Search Report and Written Opinion," for PCT Application No. PCT/US2019/039042 dated Oct. 16, 2019 (13 pages).
"Non-Final Office Action," for U.S. Appl. No. 16/450,303 dated Oct. 24, 2019 (19 pages).
"Non-Final Office Action," for U.S. Appl. No. 16/450,541 dated Oct. 1, 2019 (21 pages).
"Origami Carts and Racks," Origami webpage Apr. 20, 2016, retrieved on Dec. 9, 2019 via web.archive.org, https://origamirack.com (12 pages).
"Response to Final Office Action," for U.S. Appl. No. 15/262,733, filed on Dec. 5, 2019 (11 pages).
"Second Office Action," for Chinese Patent Application No. 201610876505.3 dated Aug. 29, 2019 (4 pages) with English Translation.
"Sunco Outdoor Kitchen," Mar. 16, 2018 URL <https://www.sunco.com.au/shop/bbqs/sc100-xspec-four-burner-outdoor-kitchen/> (3 pages).
"Traeger Wood Pellet Grills," Traeger Grills webpage Apr. 7, 2006, retrieved on Dec. 9, 2019 via web.archive.org, https://www.traegergrills.com (2 pages).
"Brown Jordan Outdoor Kitchens," by Danver Stainless Outdoor Kitchens information booklet, Apr. 2018 (28 pages).
Colon, Linda M. "Danver's Post and Panel System is a Hit with Architects, Builders, Developers & Designers," Danver Outdoor Kitchens Jun. 1, 2018 (2 pages).
File History for U.S. Appl. No. 15/262,733 downloaded Aug. 23, 2019 (326 pages).
File History for U.S. Appl. No. 15/937,666 downloaded Aug. 23, 2019 (201 pages).
"First Office Action," for Chinese Patent Application No. 20110876505.3 dated Dec. 18, 2018 (14 pages) with English Translation.
"International Preliminary Report on Patentability," for PCT Application No. PCT/US2016/051319 dated Sep. 27, 2018 (11 pages).
"International Search Report and Written Opinion," for PCT Application No. PCT/US2016/051319 dated Dec. 8, 2016 (14 pages).
"International Search Report and Written Opinion," for PCT Application No. PCT/US2018/024628 dated Jul. 11, 2018 (16 pages).

"Modular Outdoor Kitchen," Char-Broil Medallion Series Outdoor Kitchen information retrieved from https://www.charbroil.com/grills/modular-outdoor-kitchen on Aug. 8, 2019 (4 pages).
"Origami Kitchen Island Cart with Wheels," Description and Product Specs at least as early as Aug. 9, 2019 (5 pages).
"Traeger Wood Pellet Grills," Product Listing found on www.traegergrills.com at least as early as Aug. 9, 2019 (4 pages).
"Ex Parte Quayle Action," for U.S. Appl. No. 29/695,966, mailed Dec. 11, 2020 (23 pages).
"Ex Parte Quayle Action," for U.S. Appl. No. 29/695,973 mailed Dec. 11, 2020 (23 pages).
"Ex Parte Quayle Action," for U.S. Appl. No. 29/695,976 mailed Dec. 11, 2020 (24 pages).
"Fourth Office Action," for Chinese Patent Application No. 201610876505.3 dated Sep. 30, 2020 (11 pages) with English Summary.
Morgan, Grant "Nationwide Marketing Group Announces Its Partnership with TYTUS Grills," first available online Oct. 9, 2019, TytusGrills.com, [online], [site visited Nov. 27, 2020], available from internet URL: https://www.twice.com/retailing/nationwide-marketing-group-announces-its-partnership-with-tytus-grills (year: 2019).
"Non-Final Office Action," for U.S. Appl. No. 16/450,356 dated Nov. 18, 2020 (31 pages).
"Non-Final Office Action," for U.S. Appl. No. 16/450,510 dated Dec. 14, 2020 (32 pages).
"Notice of Allowance," for U.S. Appl. No. 16/450,388 dated Dec. 1, 2020 (27 pages).
"TYTUS Charcoal Grey Stainless Steel 4 Burner Free Standing Grill," first available 2020, TytusGrills.com, [online], [site visited Nov. 27, 2020], Available from internet URL: https://tytusgrills.com/collections/grills/products/tytus-charcoal-grey-stainless-steel-4-burner-free-standing-grill (Year: 2020), 5 pages.
"TYTUS Grills," first available 2020, TytusGrills.com, [online], [site visited Dec. 1, 2020], Available from internet URL: https://tytusgrills.com/collections/grills (Year: 2020), 3 pages.
"TYTUS TI404MGGLP Spec Sheet," first available 2020, AppliancesConnection.com, [online], [site visited Nov. 27, 2020], Available from internet URL: https://static.appliancesconnection.com/attachments/D5f524932e12f6.pdf (Year: 2020), 2 pages.
"TYTUS TI400MWLP Spec Sheet," first available 2020, SamsClub.com, [online], [site visited Nov. 27, 2020], Available from internet URL: https://content.syndigo.com/asset/9f341 0f8-d6c3-48c1-a02c-f5bdbb9f989b/original.pdf (Year: 2020), 2 pages.
"TYTUS TI400SSBLP341 Spec Sheet," first available 2020, AppliancesConnection.com, [online], [site visited Nov. 27, 2020], Available from internet URL: https://static.appliancesconnection.com/attachments/D5f524e4ae6c38.pdf (Year: 2020), 2 pages.
"TYTUS User Manual 4-Burner Gas Grill and 4-Burner Island Gas Grill with Side Cabinets," first available 2020, TytusGrills.com, [online], [site visited Dec. 1, 2020], Available from internet URL: https://tytusgrills.com/pages/manualsanddocuments (Year: 2020), 60 pages).
"International Preliminary Report on Patentability," for PCT Application No. PCT/US2019/038993 dated Jan. 7, 2021 (9 pages).
"International Preliminary Report on Patentability," for PCT Application No. PCT/US2019/039024 dated Jan. 7, 2021 (10 pages).
"International Preliminary Report on Patentability," for PCT Application No. PCT/US2019/039027 dated Jan. 7, 2021 (9 pages).
"International Preliminary Report on Patentability," for PCT Application No. PCT/US2019/039034 dated Jan. 7, 2021 (8 pages).
"International Preliminary Report on Patentability," for PCT Application No. PCT/US2019/039039 dated Jan. 7, 2021 (10 pages).
"International Preliminary Report on Patentability," for PCT Application No. PCT/US2019/039042 dated Jan. 7, 2021 (9 pages).
"Final Office Action," for U.S. Appl. No. 16/450,541 dated Feb. 5, 2020 (19 pages).
"Non-Final Office Action," for U.S. Appl. No. 15/262,733 dated Jan. 8, 2020 (18 pages).
"Notice of Allowance," for U.S. Appl. No. 15/937,666 dated Feb. 18, 2020 (14 pages).
"Notice of Allowance," for U.S. Appl. No. 16/450,303 dated Feb. 14, 2020 (13 pages).

(56) References Cited

OTHER PUBLICATIONS

"Notice of Allowance," for U.S. Appl. No. 16/450,541 dated May 14, 2020 (12 pages).
"Response to Final Office Action," for U.S. Appl. No. 16/450,541, filed on May 5, 2020 (7 pages).
"Response to Non Final Office Action," for U.S. Appl. No. 16/450,541, filed on Dec. 30, 2019 (16 pages).
"Third Office Action," for Chinese Patent Application No. 201610876505.3 dated Mar. 19, 2020 (8 pages) with English Translation.
"Notice of Allowance," for U.S. Appl. No. 29/695,969 dated Mar. 24, 2021 (18 pages).
"Notice of Allowance," for U.S. Appl. No. 29/695,976 dated Mar. 8, 2021 (16 pages).
"Notice of Allowance," for U.S. Appl. No. 16/450,356 dated Feb. 26, 2021 (17 pages).
"Notice of Allowance," for U.S. Appl. No. 16/450,510 dated Mar. 22, 2021 (18 pages).
"Notice of Allowance," for U.S. Appl. No. 29/695,966 dated Mar. 1, 2021 (14 pages).
"Notice of Allowance," for U.S. Appl. No. 29/695,973 dated Mar. 3, 2021 (16 pages).
"Response after Ex Parte Quayle Action," for U.S. Appl. No. 29/695,966, filed on Feb. 9, 2021 (4 pages).
"Response after Ex Parte Quayle Action," for U.S. Appl. No. 29/695,973, filed on Feb. 9, 2021 (4 pages).
"Response after Ex Parte Quayle Action," for U.S. Appl. No. 29/695,976, filed on Feb. 9, 2021 (4 pages).
"Response to Non Final Office Action," for U.S. Appl. No. 16/450,356, filed on Feb. 17, 2021 (11 pages).
"Response to Non Final Office Action," for U.S. Appl. No. 16/450,510, filed on Mar. 12, 2021 (11 pages).
"Office Action," for Chinese Patent Application No. 202022193760.2 dated Apr. 19, 2021 (4 pages) with English Translation.

* cited by examiner

GAS TANK GUARD IN GRILL CART

CLAIM OF PRIORITY

This application claims the benefit of U.S. Provisional Application No. 62/690,700, filed Jun. 27, 2018, the content of which is herein incorporated by reference in its entirety.

REFERENCE TO RELATED APPLICATIONS

The following five nonprovisional applications also claim priority to U.S. Provisional Application No. 62/690,700, are co-owned, and are filed on the event date herewith: U.S. application Ser. No. 16/910,966, titled, "Grill and Side Cart Attachment Systems and Methods,"; U.S. application Ser. No. 16/450,356, titled, "Securing of Panels to Grill System,"; U.S. application Ser. No. 16/450,388, titled, "Grill System with Decorative Panels,"; U.S. application Ser. No. 16/450,510, titled, "Side Cart Locking Mechanism,"; and U.S. application Ser. No. 16/450,541, titled, "Grill Assembly with Foldable Cart,"; the contents of which for each application are herein incorporated by reference in their entirety. The following four design applications are co-owned and are filed on the event date herewith: U.S. Design Application No. 29/695,966, titled, "Grill System,"; U.S. Design Application No. 29/695,969, titled, "Grill Assembly,"; U.S. Design Application No. 29/695,973, titled, "Grill Cart,"; U.S. Design Application No. 29/695,976, titled, "Side Assembly,"; the contents of which for each application are herein incorporated by reference in their entirety.

FIELD

The present application relates to grills and outdoor cooking systems. More specifically, the present application relates to easily assembled grills and outdoor cooking systems.

BACKGROUND

Grilling is a cooking style that is especially popular in the United States. Grills are frequently not particularly portable or easy to set up. In many cases, grills are difficult to assemble due to numerous steps requiring the user to construct a frame with numerous components.

Attempts have been made to design grills that are easy to assemble after unloading from shipping containers. However, in many past systems, grill systems include a large number of pieces, require numerous steps to assemble, and some assembly steps require tools.

Some past systems mount a firebox on a foldable stand. However, the foldable stands can require complex set-up steps and, even in the folded configuration, some of the foldable stands take-up significant space.

Permanent outdoor grill installations are increasingly popular, and allow consumers to choose many finishes and options to create an attractive and functional outdoor kitchen environment. These installations are very expensive, and lack the flexibility of a moveable grill system.

SUMMARY

In an embodiment, a grill system is provided. The grill system can include a grill assembly. The grill assembly can include a grill cart, a burner box, and a gas tank guard coupled to the grill cart. The burner box is coupled to a top portion of the grill cart. The grill cart is transtionable between a folded state and a upright state. The grill cart defining an interior volume. The interior volume is greater when the grill cart is in the upright state than when the grill cart is in the folded state. The gas tank guard is configured to prevent two or more gas tanks from being placed within the interior volume of the grill cart when the grill cart is in the upright state. The gas tank guard is coupled to the grill cart in both the folded state and the upright state.

In an embodiment, the gas tank guard includes a first end and a second end. The first end is rotatably coupled to the grill cart and the second end is rotatably coupled to the grill cart.

In an embodiment, the grill cart includes a bottom portion, a first side, a front side, a second side, and a back side. The gas tank guard is coupled to the bottom surface and one of the first side, the front side, the second side, or the back side.

In an embodiment, the gas tank guard extends over at least 30% of the length of the bottom surface or over at least 30% of the width of the bottom surface.

In an embodiment, the gas tank guard includes a first portion connected with a moveable joint to a second portion.

In an embodiment, the first portion and the second portion form an angle of at least 30° and not more than 105° when the grill cart is in the upright state.

In an embodiment, the first portion and the second portion form an angle of no more than 15° when the grill cart is in the upright state.

In an embodiment, the gas tank guard is in a first position when the grill cart is in the folded state and in a second position when the grill cart is in the upright state.

In an embodiment, the interior volume of the grill cart in the folded state is less than 3 feet$^3$.

In an embodiment, the interior volume of the grill cart in the upright state is at least 8 feet$^3$ and not more than 115 feet$^3$.

In an embodiment, the gas tank guard is rigid or a flexible element that is taut when the grill cart is in the upright state.

In an embodiment, the gas tank guard includes metal.

In an embodiment, a method of assembling a grill system is included. The method can include obtaining a grill cart. The grill cart is in a folded position. The grill cart includes a bottom portion, a first side, a front side, a second side, a back side and a gas tank guard coupled to the grill cart within an interior volume defined by the grill cart. The gas tank guard is in a first position. The method can further include transitioning the grill cart into an upright position. The interior volume is larger when the grill cart is in the upright state than the interior volume when the grill cart is in the folded state. The gas tank guard is transitioned into a second position. The gas tank guard is configured to prevent two or more gas tanks from being placed within the interior volume of the grill cart when the grill cart is in the upright state.

In an embodiment, the method can further include: coupling a burner box to the grill cart.

In an embodiment, the method can further include: inserting a gas tank into the interior volume of the grill cart.

In an embodiment, the method can further include: connecting the gas tank to the burner box with a tube to facilitate the flow of gas from the gas tank to the burner box.

In an embodiment, the gas tank guard is rotatably coupled to at least two of the bottom portion, the first side, the second side, the front side, and the back side.

In an embodiment, a method of manufacturing a grill system is included. The method can include assembling a grill cart. The grill cart includes a bottom portion, a first side, a second side, a front side, and a back side. The grill cart is configured to be transitioned between a folded state and an upright state. The method can further include coupling a gas tank guard to the grill cart; arranging the grill cart into the folded state; and packaging the grill cart in a folded state into a shipping container.

In an embodiment, the method can further can include: adding identification information to a portion of the grill.

In an embodiment, the shipping container is a cardboard box.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

Described below and shown in the figures are various embodiments of components that can be included in a grill system. The grill system can include a grill assembly and one or more side assemblies. The grill assembly can include a burner box, which can be used to cook foods, such as meats and vegetables. Each side assembly can include a functional top cap to provide additional functionality to the grill system.

The grill and side assemblies can be shipped or transported in a folded configuration. In the folded configuration, the grill and side assemblies can have a smaller volume compared to the upright configurations. The smaller volume can reduce the cost of storing and transporting the components.

The grill and side assemblies described herein can be easily assembled. In many cases, the grill and side assemblies can be assembled by a single user or only two users. In many examples, the grill and side assemblies can be assembled without the use of tools. In many examples, the grill and side assemblies can be assembled quickly, such as in less than three minutes for each component.

The burner box can be disposed on top of a grill cart. In many scenarios a gas tank, such as a liquid propane tank, is connected to the burner box. Frequently, the gas tank being used is located in the grill cart below the burner box. Some users prefer to keep an extra gas tank nearby, such as to use if the primary gas tank runs out of fuel. Users sometimes wish to store the extra gas tank in the grill cart, adjacent to the primary gas tank. However, it is often recommended that a secondary gas tank is not stored in the grill cart for safety reasons. As such, various embodiments disclosed herein include a gas tank guard that prevents a user from storing a secondary gas tank in the grill cart. The gas tank guard can be attached to the grill cart, such that as the grill cart is transitioned from a folded state to an upright state the gas tank guard can be positioned into its desired location to prevent a secondary gas tank from being stored in the grill cart.

Grill System with Grill Assembly and Side Assemblies

Figure 1:
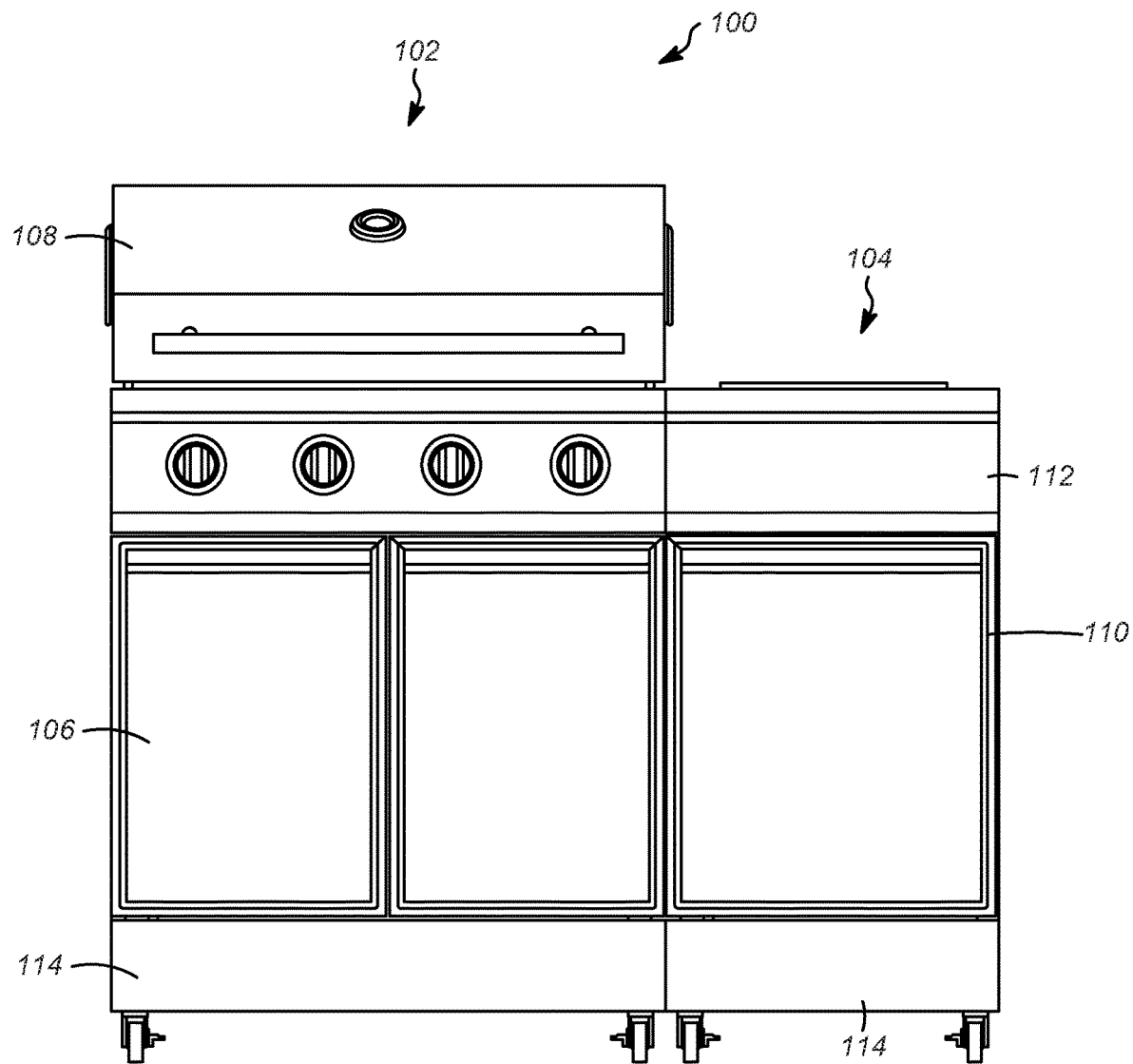
FIG. 1 is a front view of a grill system in accordance with various embodiments herein.

The figures show various views and embodiments of grill systems and components. FIG. 1 shows a grill system 100 including a grill assembly 102 and a side assembly 104. The grill assembly 102 can include a grill cart 106 and a burner box 108 (also referred to as a "firebox") coupled to a top portion of the grill cart 106. The side assembly 104 can include a side cart 110 and a top cap 112. The top cap 112 can be coupled to a top portion of the side cart 110.

Figure 2:
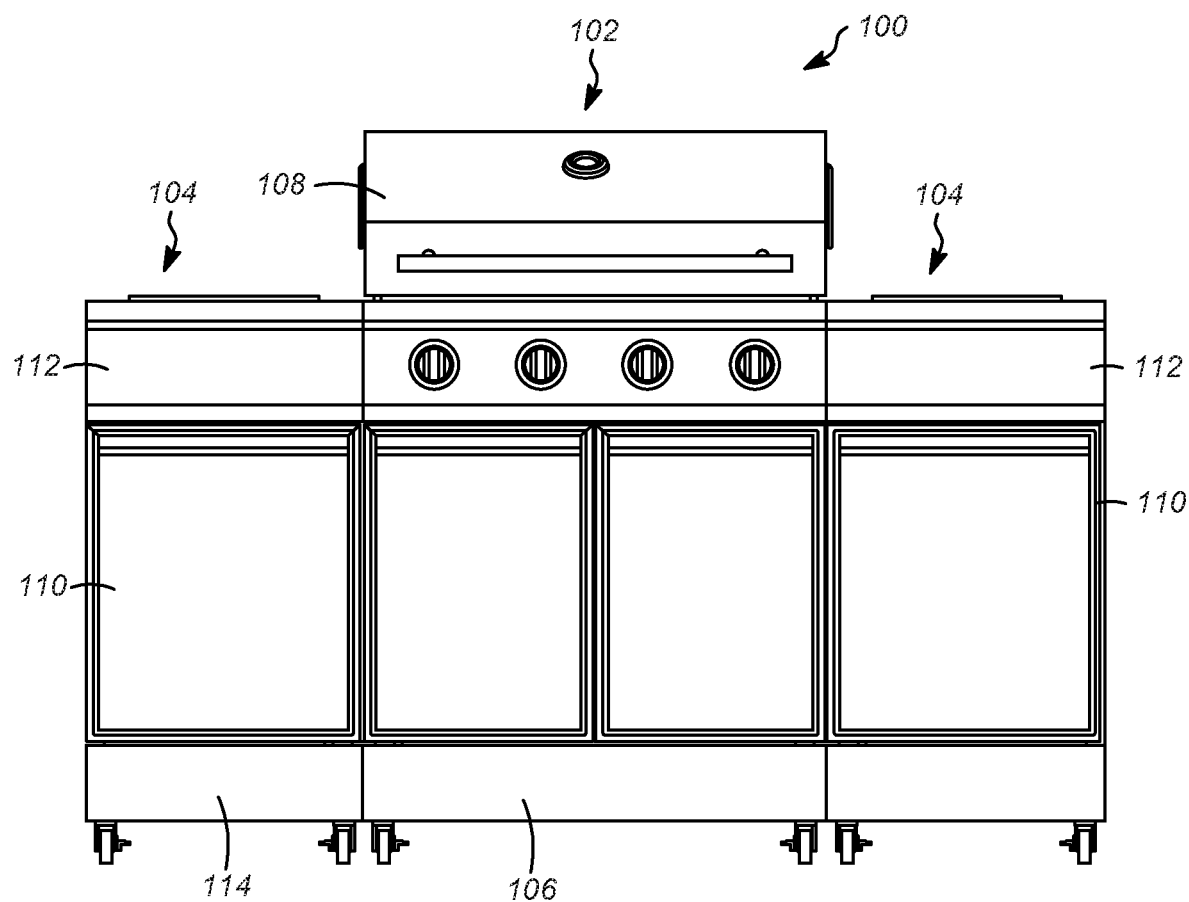
FIG. 2 is a front view of a grill system in accordance with various embodiments herein.

FIG. 2 shows a front view of a grill system 100 in accordance with various embodiments herein. In some embodiments, the grill system 100 can include a grill assembly 102, and two or more side assemblies 104. Each of the side assemblies 104 can include a side cart 110 and a top cap 112. In some embodiments, the side assemblies 104 can be disposed on opposite sides of the grill assembly 102, such as shown in FIG. 2. In some embodiments, the side assemblies 104 can be disposed on the same side of the grill assembly 102. In other embodiments, the grill system 100 can include additional side assemblies 104, such as three, four, five, six, or more side assemblies 104.

In some embodiments, an equal number of side assemblies 104 can be located on either side of the grill assembly 102. In some embodiments, the number of side assemblies 104 on one side of the grill assembly 102 can be greater than or less than the number of side assemblies 104 on the other side of the grill assembly 102.

In various embodiments, the burner box 108 can include a first connection structure, and the top cap 112 can include a second connection structure. The first connection structure can be configured to mate with the second connection structure to couple the grill assembly 102 to the side assembly 104.

In some embodiments, the grill assembly 102 can include a toe kick panel 114. In some embodiments, the side assembly 104 can include a toe kick panel 114. In some embodiments, the toe kick panel 114 of the grill assembly 102 can include a connection feature and the toe kick panel 114 of the side assembly 104 can include a connection feature, such as two portions of a latch mechanism. The connection features of the two toe kick panels 114 can be coupled together to couple the grill assembly 102 with the side assembly 104.

In some embodiments, the grill cart 106 can include one or more panels on the sides of the grill cart 106. In some embodiments, the grill cart 106 can include a toe kick panel 114. In some embodiments, the toe kick panel 114 and the panel can include a common decorative design to provide a cohesive appearance.

Grill Assembly

Figure 3:
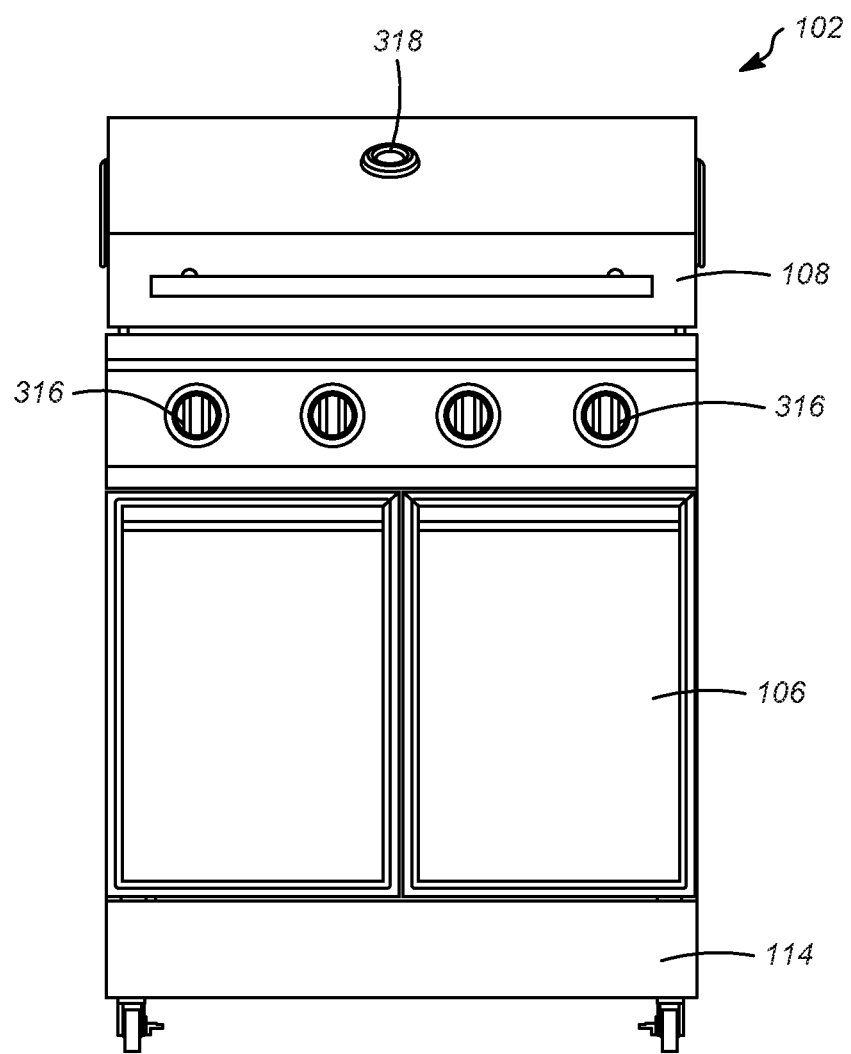
FIG. 3 is a front view of a grill assembly in accordance with various embodiments herein.

In reference now to FIG. 3, a front view of a grill assembly 102 is shown in accordance with various embodiments herein. The grill assembly 102 can include a burner box 108 coupled to a top portion of a grill cart 106.

Burner Box

The burner box 108 can be used to heat or cook foods. The burner box 108 can include an interior volume, which food is place into. The burner box 108 can include one or more grill grates disposed within the interior volume. The grill grates can be configured to support food which is being cooked or heated in the burner box 108. The burner box 108 can include a connection for a gas supply, such as a gas supply from a gas tank within the grill cart 106.

The burner box 108 can include one or more burners within the interior volume, the burners can be configured to burn the gas and create heat in the interior volume. In some embodiments, the burner box 108 can include one or more control units 316, such as dials, buttons, or switches. The control units 316 can be configured to allow a user to start the flow of fuel, stop the flow of fuel, change the fuel flow rate, or ignite the fuel. In some embodiments, the grill cart 106 can include one or more control units 316. In some embodiments, the burner box 108 can include a thermometer 318, such as to measure the temperature of the interior volume.

Grill Cart

The grill cart 106 can provide a support or a stand for the burner box 108. The grill cart 106 can include a bottom portion 420 and a top portion 422 (shown in FIG. 4). The burner box 108 can be coupled to the top portion 422 of the grill cart 106. In some embodiments, the bottom portion 420 can include wheels 424, or casters, such as to provide easy portability for the grill assembly 102. In some embodiments, the wheels 424 can include a brake or lock to prevent the wheels from rotating thereby preventing the cart from moving. In various embodiments, the bottom portion 420 can include adjustable leveling feet or adjustable leveling wheels to allow a user to adjust the height of the feet or wheels, such as to accommodate for uneven surfaces, which can be common in outdoor applications.

The grill cart 106 can include one or more doors 426. The doors 426 can provide access to the interior of the grill cart 106. In various embodiments, the interior of the grill cart 106 can house a gas tank. The gas tank can supply the burner box 108 with gas. In some embodiments, the interior of the grill cart 106 can be configured to house or store other related equipment, such as tongs, spatulas, or brushes.

Figure 4:
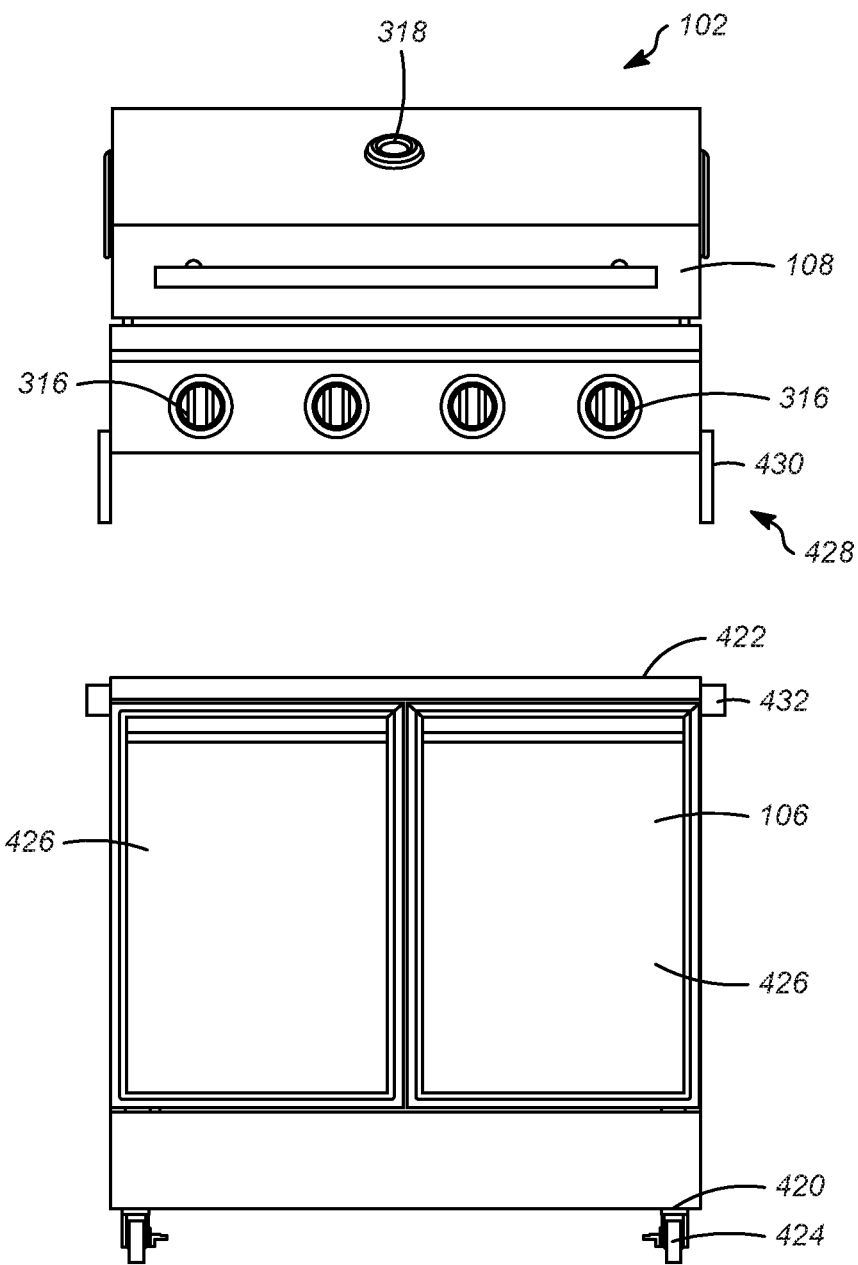
FIG. 4 is a partially exploded view of a grill assembly in accordance with various embodiments herein.

FIG. 4 shows a front view of the grill assembly 102 with the burner box 108 uncoupled from the grill cart 106. The burner box 108 can be coupled to the grill cart 106 via one or more latch mechanisms 428. In various embodiments, the burner box 108 can include a first portion 430 of the latch mechanism 428, and the grill cart 106 can include a second portion 432 of the latch mechanism 428.

In some embodiments, the first portion 430 includes a tongue extending away from and below the burner box 108. In various embodiments, the second portion 432 defines a receiving bracket or receiving pocket. Coupling the burner box 108 with the grill cart 106 can include inserting the tongue of the first portion 430 into the receiving bracket or receiving pocket of the second portion 432.

In some embodiments, the first portion 430 can further include a hoop, ring, hook, or other device that defines an opening. The second portion 432 can include a projection for mating with the loop of the first portion 430. The first portion 430 can be configured to receive the projection from the second portion 432 into the opening defined by the loop. In various embodiments, the first portion 430 can transition between an open position and a closed position. In the open position the opening can easily receive the projection. In the closed position, the projection can be secured in the opening.

Other options for coupling a burner box to a grill cart are described in co-owned U.S. application Ser. No. 15/937,666 filed on Mar. 27, 2018, which is hereby incorporated by reference in its entirety.

In various embodiments, the grill cart 106 can be configured to be transitionable between a folded state (shown in FIGS. 5 and 6) and an upright state (shown in FIGS. 1-4 and 9). The grill cart 106 can define an interior volume. The interior volume can be greater when the grill cart 106 is in the upright state than when the grill cart 106 is in the folded state.

The grill cart 106 can further include a gas tank guard (shown in FIGS. 8-15). The gas tank guard can be configured within the interior volume of the grill cart 106 to prevent a second gas tank from being placed in the grill cart 106. The gas tank guard 848 can be configured within the interior volume to prevent two or more gas tanks from being placed within the interior volume of the grill cart 106 when the grill cart is in the upright state. In various embodiments, a gas tank can refer to a standard 20 lbs or a 4.5 gallon propane tank, which is most commonly used in association with gas grills.

The gas tank guard can occupy a space or divide a space into sections that are not capable of accepting a second gas tank. The space would otherwise be capable of accepting a second gas tank without the gas tank guard. The gas tank guard can be coupled to the grill cart 106 in both the folded state and the upright state. The gas tank guard can be configured to transition between a folded state and an upright state along with the grill cart 106. The gas tank guard can be coupled to the grill cart 106 such that the gas tank guard transitions between the folded state and the upright state along with the grill cart 106, such as without any additional input for the gas tank guard.

Figure 5:
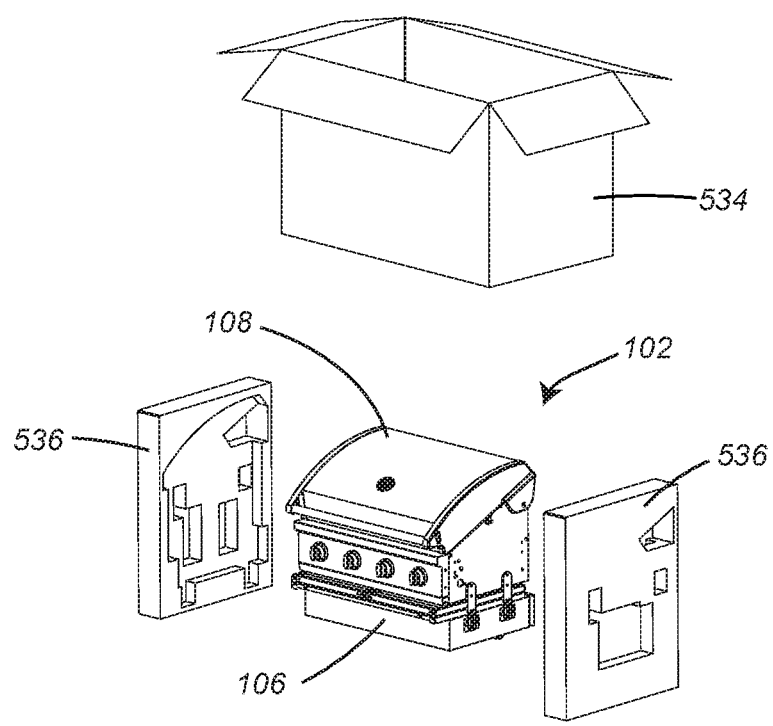
FIG. 5 is a schematic of a grill assembly in a folded state in accordance with various embodiments herein.

FIG. 5 shows a schematic of a grill assembly 102 in a folded state in accordance with various embodiments herein. FIG. 5 further shows the grill assembly 102 along with packaging. In some embodiments, the grill assembly 102 or the grill cart 106 in a folded state can be inserted or packaged into a shipping container 534, such as a cardboard box. In various embodiments, packaging or cushioning 536, such as polystyrene foam, can surround portions of the grill assembly 102 or grill cart 106 in the shipping container 534. In various embodiments, identification information, such as model number or serial number, can be added to a portion of the grill assembly 102, the grill cart 106, or the shipping container 534. In some embodiments, the identification information can be printed directly onto the grill assembly 102, grill cart 106, or the shipping container 534. In other embodiments, the identification information can be printed on a label or sticker which can be adhered to the grill assembly 102, grill cart 106, or the shipping container 534.

Figure 8:
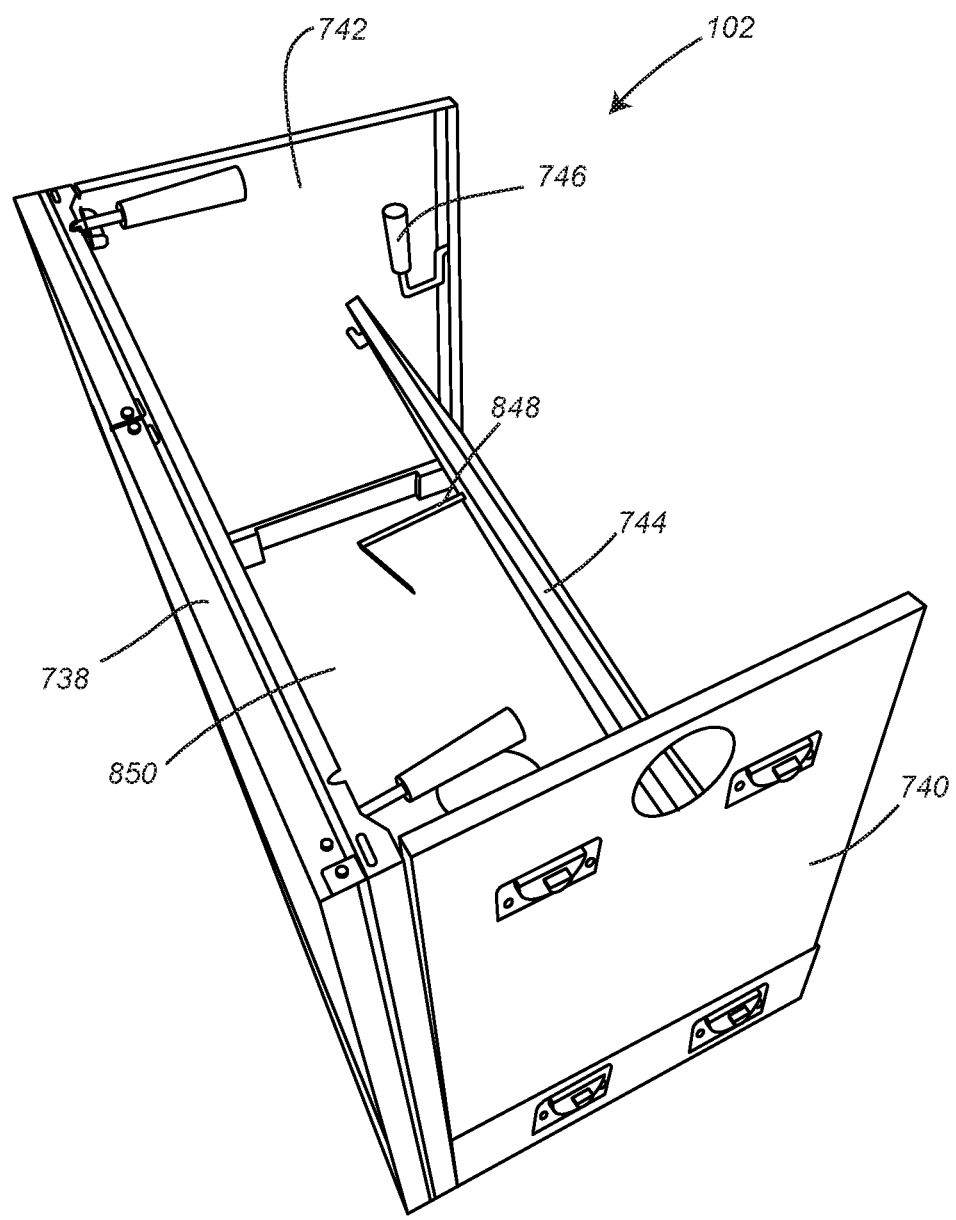
FIG. 8 is a schematic of a grill cart being unfolded in accordance with various embodiments herein.
Figure 9:
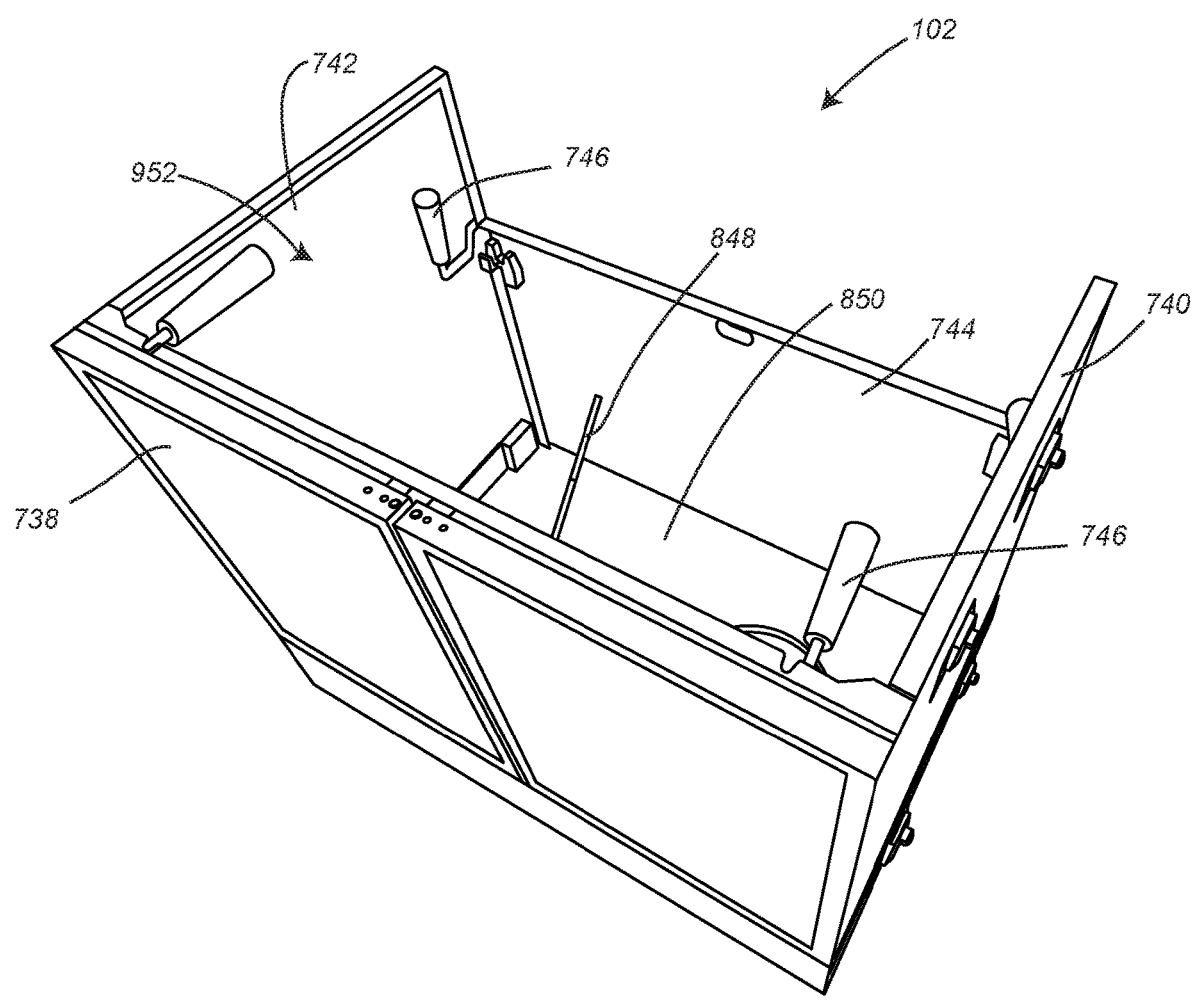
FIG. 9 is a schematic of a grill cart being unfolded in accordance with various embodiments herein.

FIGS. 6-9 show various stages of a grill cart 106 transitioning from a folded state (FIG. 6) to an upright state (FIG. 9). In some embodiments, the front frame or panel, back frame or panel, and two side frames or panels can be parallel with each other when the grill cart 106 is in the folded state. In some embodiments, a frame can be a panel. In some embodiments a frame can include a panel. In some embodiments, a frame can be configured to receive a panel. In some embodiments, a frame can be rectangular or include four sides. In some embodiments, a frame can define an opening or aperture, such as to receive a panel. In some embodiments, a frame can have an open side, such as to receive a panel. In some embodiments, a frame can provide a base structure for other components to be coupled to, such as a door or panel.

Figure 6:
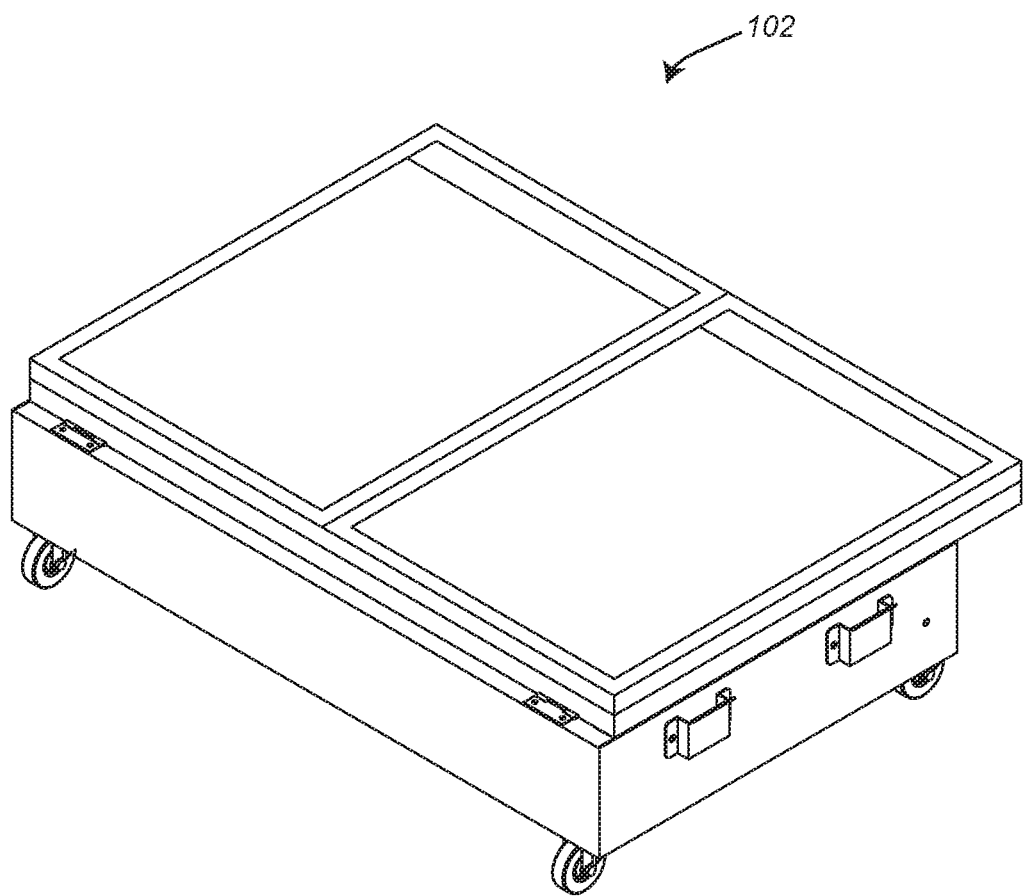
FIG. 6 is a schematic of a grill cart in a folded state in accordance with various embodiments herein.
Figure 7:
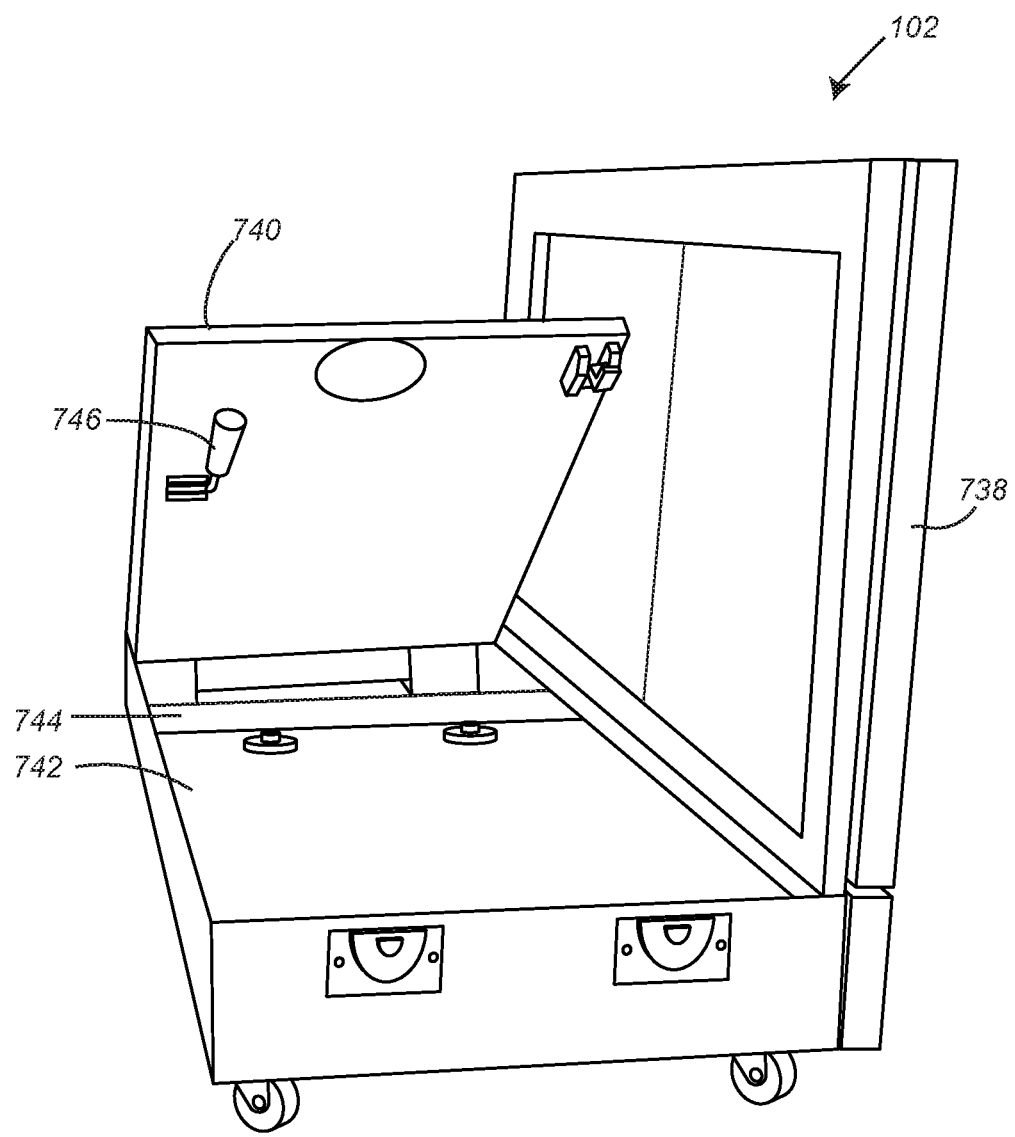
FIG. 7 is a schematic of a grill cart being unfolded in accordance with various embodiments herein.

FIG. 6 shows a schematic of the grill cart 106 in a folded state in accordance with various embodiments herein. In various embodiments the interior volume of the grill cart 106 in the folded state can be less than 2 ft$^3$. In some embodiments, the interior volume of the grill cart 106 in the folded state can be less than 1 ft$^3$, 3 ft$^3$, 4 ft$^3$, or 5 ft$^3$. In other embodiments, the interior volume can be negligible, such as when the panels 738, 740, 742, 744 are positioned on top of one another without space between them.

In various embodiments, the grill cart 106 can be transitioned from the folded state to the upright state by unfolding the front frame or panel 738, a first side frame or panel 740, a second side frame or panel 742, and a back frame or panel 744. In various embodiments, the front panel 738, the first side panel 740, the second side panel 742, and the back panel 744 can be unfolded in any order. In various embodiments, the gas tank guard can be coupled to a bottom surface or portion of the grill cart 106 and one of the panels 738, 740, 742, 744. The panel 738, 740, 742, 744 which the gas tank guard is coupled to can be last panel to be transitioned from the folded state to the upright state. The gas tank guard, in its folded state, can be located between the panel 738, 740, 742, 744 which it is coupled to and the bottom portion.

In various embodiments, the panels 738, 740, 742, 744 can include locking elements 746, such as described in co-owned U.S. application Ser. No. 15/937,666 mentioned above.

FIG. 8 shows a schematic of the grill cart 106 being unfolded further. FIG. 8 shows the front panel 738, the first side panel 740 and the second side panel 742 in the upright configuration. The back panel 744 and the gas tank guard 848 are in a position between the folded state and the upright state. As can be seen in FIG. 8, the gas tank guard 848 can be coupled to the bottom surface 850 of the grill cart 106 and one of the panels 738, 740, 742, 744. In this embodiment, the gas tank guard 848 is coupled to the bottom surface 850 and the back panel 744.

FIG. 9 shows a schematic of the grill cart 106 in the upright state in accordance with various embodiments herein. In some embodiments, the interior volume 952 of the grill cart 106 is at least 6 ft$^3$ and not more than 115 ft$^3$. In other embodiments, the interior volume 952 can be at least 8 ft$^3$ and not more than 20 ft$^3$.

Once the grill cart 106 is in the upright state, the panels can be locked in the upright state via the locking elements 746. After the panels are locked in the upright state, the burner box 108 can be coupled to the top of the grill cart 106.

Gas Tank Guard

Figure 10:
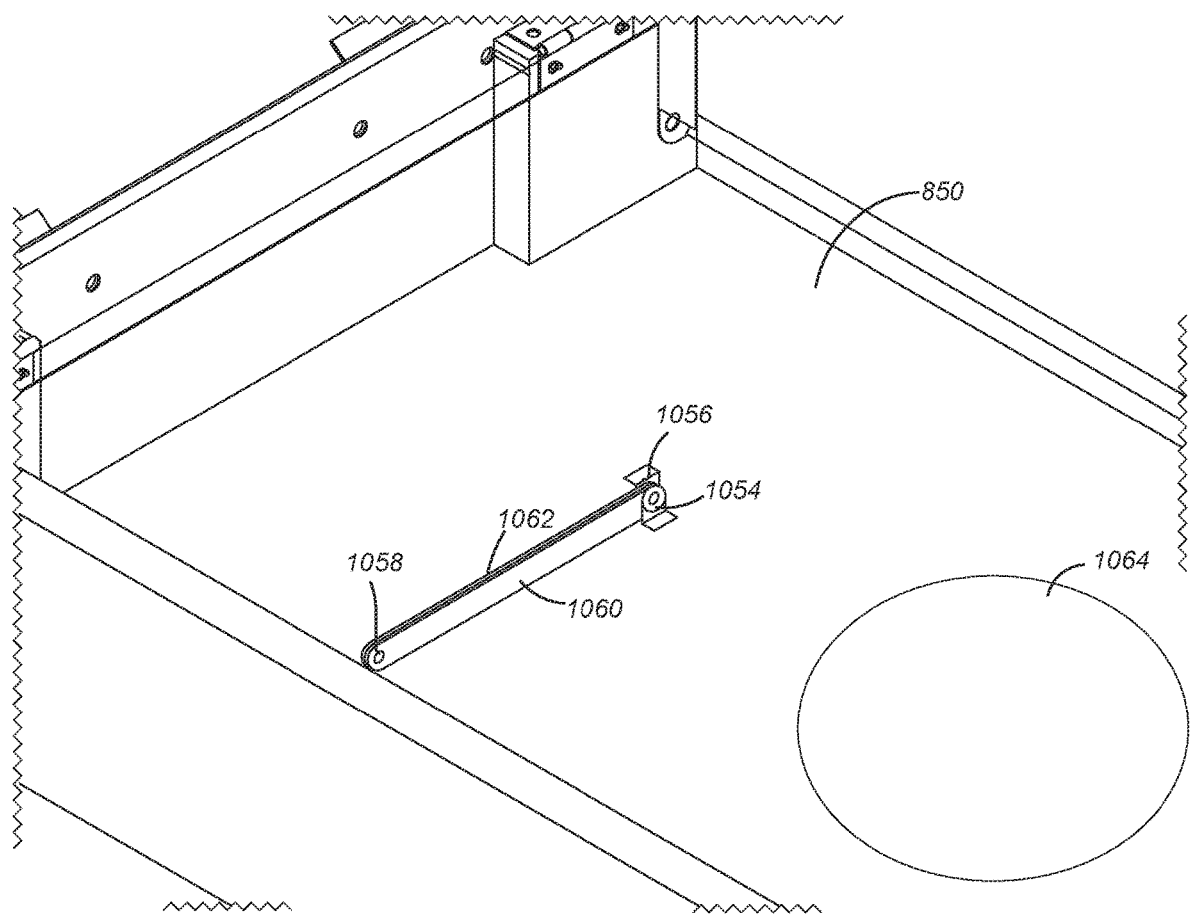
FIG. 10 is a schematic of a gas tank guard in a folded state in accordance with various embodiments herein.
Figure 11:
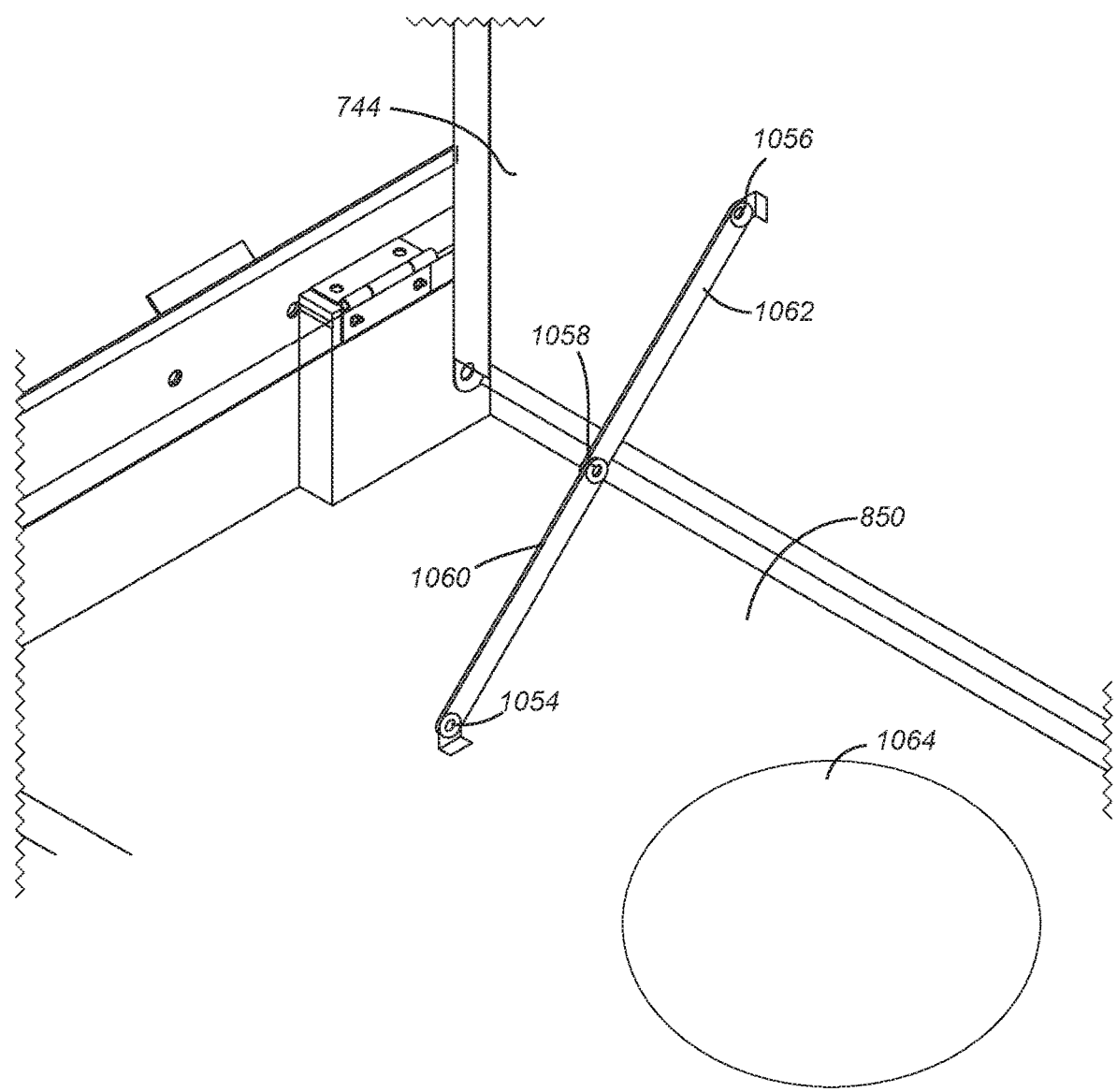
FIG. 11 is a schematic of the gas tank guard of FIG. 10 in an upright state in accordance with various embodiments herein.
Figure 13:
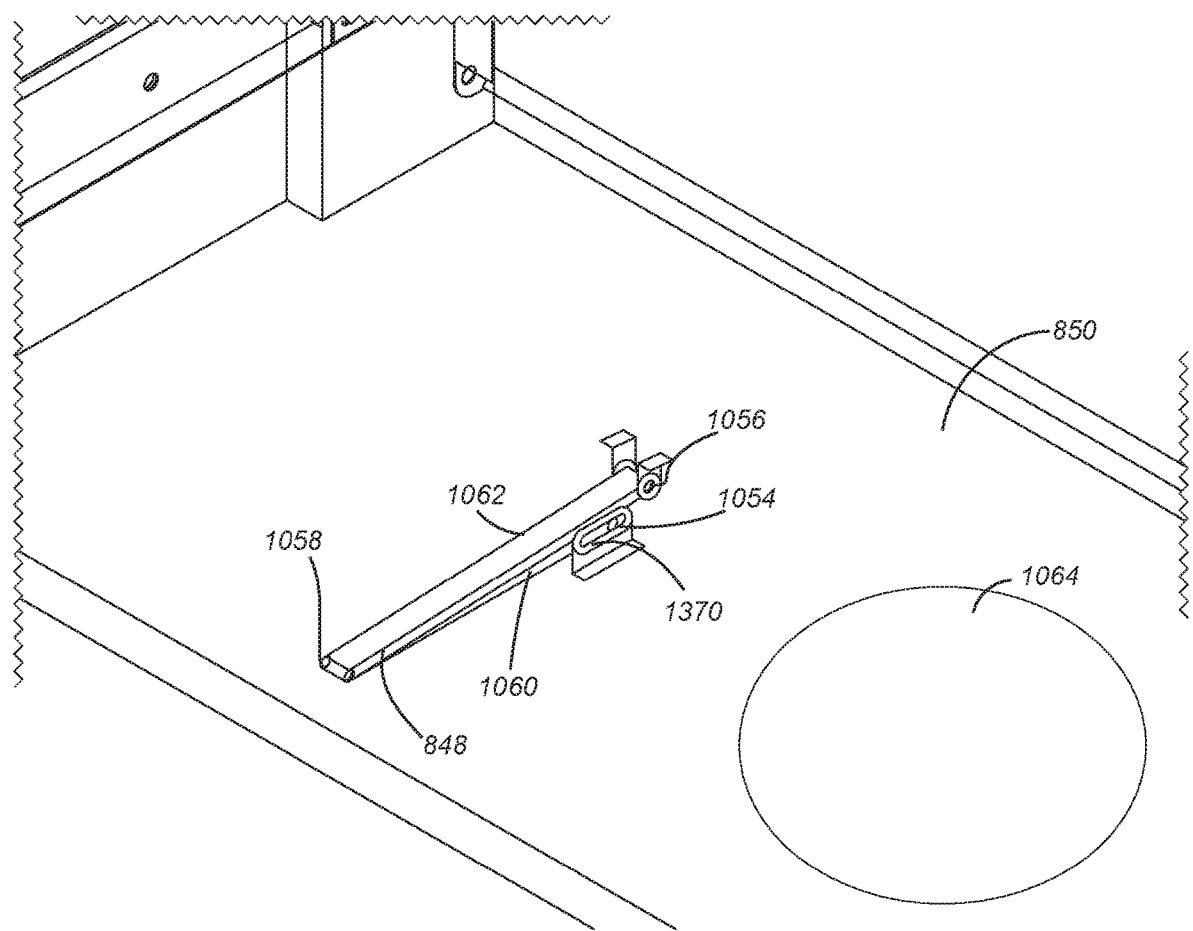
FIG. 13 is a schematic of an alternate gas tank guard in a folded state in accordance with various embodiments herein.
Figure 14:
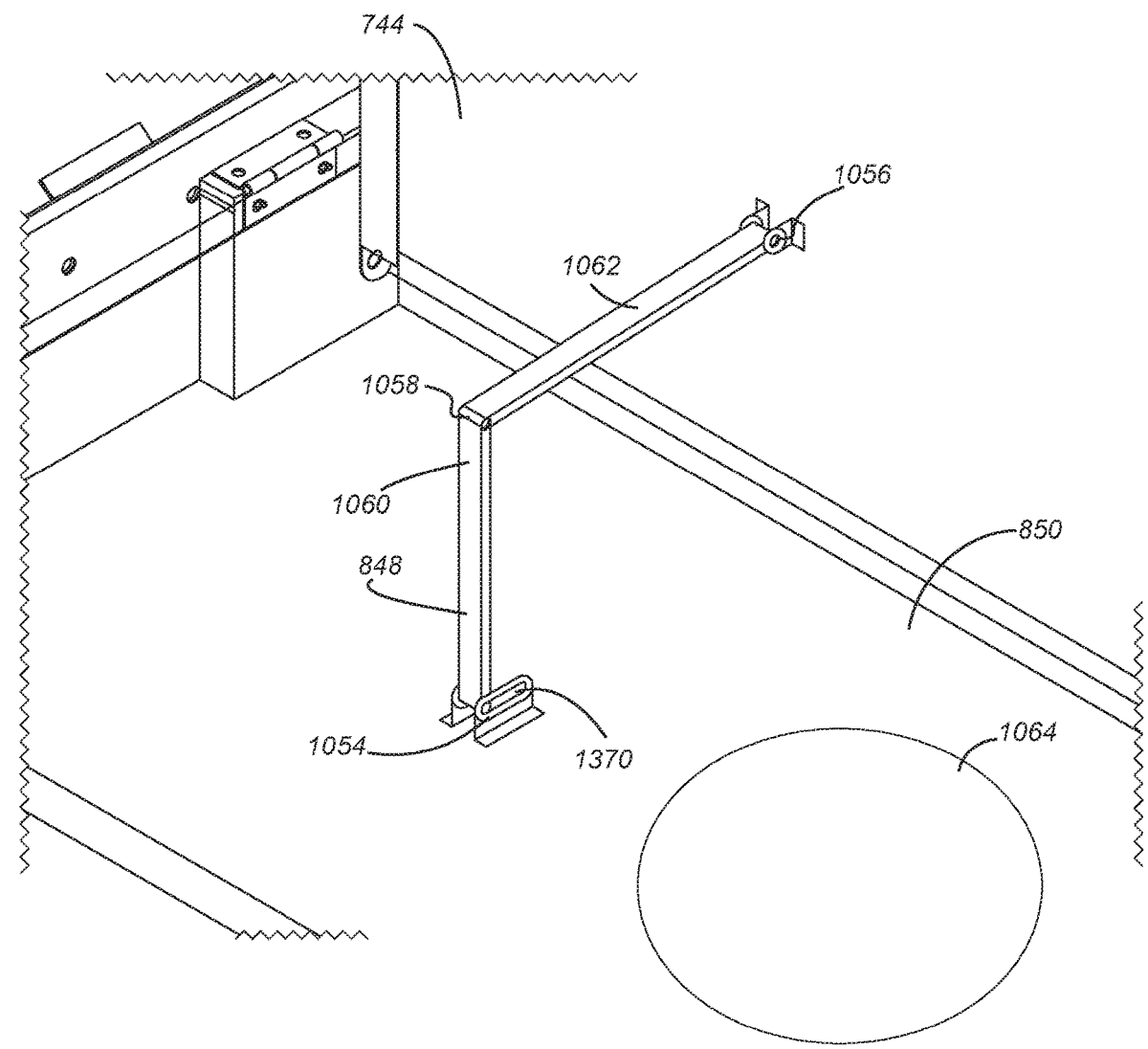
FIG. 14 is a schematic of the gas tank guard of FIG. 13 in an upright state in accordance with various embodiments herein.

In various embodiments, the gas tank guard can be in a first configuration when the grill cart 106 is in the folded state (as shown in FIGS. 10 and 13) and in a second configuration when the grill cart 106 is in the upright state (as shown in FIGS. 11 and 14). In some embodiments, the gas tank guard can include rigid components, such that the components maintain their individual shapes. In some embodiments, the gas tank guard can include metal. In some embodiments, the gas tank guard can include a flexible element, such as a chain, a string, or a rope. In such embodiments, the gas tank guard can become taut when transitioning the grill cart 106 from the folded state to the upright state.

FIG. 10 shows a schematic of the gas tank guard 848 in a folded state in accordance with various embodiments herein. In FIG. 10 the back panel 744 is not shown for clarity.

In some embodiments, the gas tank guard 848 can include a first end 1054 that can be coupled, such as rotatably coupled, to the grill cart 106, such as the bottom surface 850. The gas tank guard 848 can include a second end 1056 that can be coupled, such as rotatably coupled, to the grill cart 106, such as the back panel 744.

In various embodiments, the gas tank guard 848 can include a first portion 1060 and a second portion 1062. The first portion 1060 can be rotatably coupled with the second portion 1062, such as with a moveable or rotatable joint 1058. In some embodiments, in the folded state, the first portion 1060 and the second portion 1062 can be parallel substantially parallel with each other and can be disposed adjacent to each other. In contrast to the folded state, in some embodiments in the upright state (shown in FIG. 11) the first portion 1060 can be parallel or substantially parallel with the second portion 1062. In various embodiments, "substantially parallel" can refer to two components that are within 15 degrees of parallel, within 10 degrees of parallel, within 5 degrees of parallel, within 3 degrees of parallel, within 1 degree of parallel, or are parallel. In some embodiments, in the upright state, the first portion 1060 can be aligned with the second portion 1062.

In some embodiments, the grill cart 106 can include a gas tank mount 1064. The gas tank mount can be located on a portion of the bottom surface 850. In some embodiments, the gas tank mount 1064 can be located on one side of a center line of the bottom surface and the gas tank guard 848 can be located on the opposite side of the center line, such that the gas tank guard 848 and the gas tank mount 1064 are on opposite halves of the bottom surface 850.

FIG. 11 shows the gas tank guard 848 in the upright state in accordance with various embodiments herein. In various embodiments the first portion 1060 can be aligned with the second portion 1062 in the upright configuration. The gas tank guard 848 can occupy a portion of the interior space such that a second gas tank cannot be placed on the bottom surface 850 inside the interior volume 952.

Figure 12:
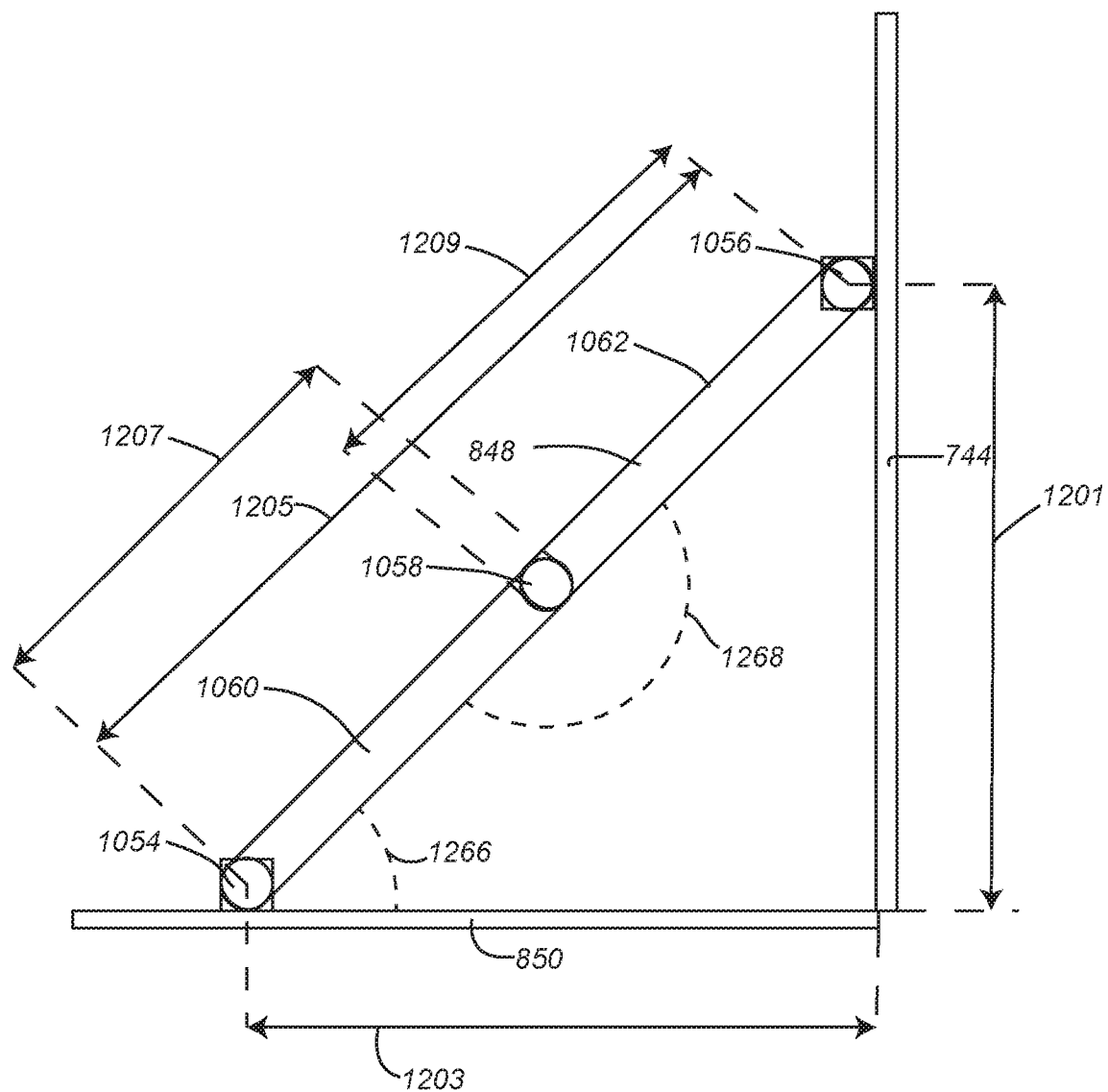
FIG. 12 is a schematic of a grill cart with the gas tank guard of FIG. 10 in accordance with various embodiments herein.

FIG. 12 shows a schematic of the grill cart 106 in the upright configuration with a gas tank guard 848 in the second configuration in accordance with various embodiments herein. In various embodiments, the bottom surface 850 and the back panel 744 can be configured at a right angle.

In various embodiments, the angle 1266 between the first portion 1060 and the bottom surface 850 can be at least 5° and not more than 85°. In various embodiments, the angle 1266 between the first portion 1060 and the bottom surface 850 can be at least 10° and not more than 80°. In various embodiments, the angle 1266 between the first portion 1060 and the bottom surface 850 can be at least 15° and not more than 75°. In various embodiments, the angle 1266 between the first portion 1060 and the bottom surface 850 can be at least 20° and not more than 70°. In various embodiments, the angle 1266 between the first portion 1060 and the bottom surface 850 can be at least 25° and not more than 65°. In various embodiments, the angle 1266 between the first portion 1060 and the bottom surface 850 can be at least 30° and not more than 60°. In various embodiments, the angle 1266 between the first portion 1060 and the bottom surface 850 can be about 45°. The angle between the second portion 1062 and the back panel 744 can have the same ranges as the angle 1266.

In various embodiments, the angle 1268 between the first portion 1060 and the second portion 1062 can be about 180°. In various embodiments, the angle 1268 between the first portion 1060 and the second portion 1062 can be at least 90° and not more than 220°. In various embodiments, the angle 1268 between the first portion 1060 and the second portion 1062 can be at least 140° and not more than 220°. In various embodiments, the angle 1268 between the first portion 1060 and the second portion 1062 can be at least 150° and not more than 210°. In various embodiments, the angle 1268 between the first portion 1060 and the second portion 1062 can be at least 160° and not more than 200°. In various embodiments, the angle 1268 between the first portion 1060 and the second portion 1062 can be at least 170° and not more than 190°.

In some embodiments, the second end 1056 can be located a distance 1201 away from the bottom surface 850. In some embodiments, the distance 1201 can be at least 5 inches and not more than 20 inches, such as about 10.25 inches.

In some embodiments, the first end 1054 can be located a distance 1203 away from the back panel 744. In some embodiments, the distance 1203 can be at least 5 inches and not more than 20 inches, such as about 10 inches.

In some embodiments, the overall length 1205 of the gas tank guard 848 can be at least 10 inches and not more than 20 inches, such as about 14.5 inches. In some embodiments, the first portion 1060 can have a length 1207 of at least 5 inches and not more than 15 inches, such as about 7.25 inches. In some embodiments, the second portion 1062 can have a length 1209 of at least 5 inches and not more than 15 inches, such as about 7.625 inches.

Figure 15:
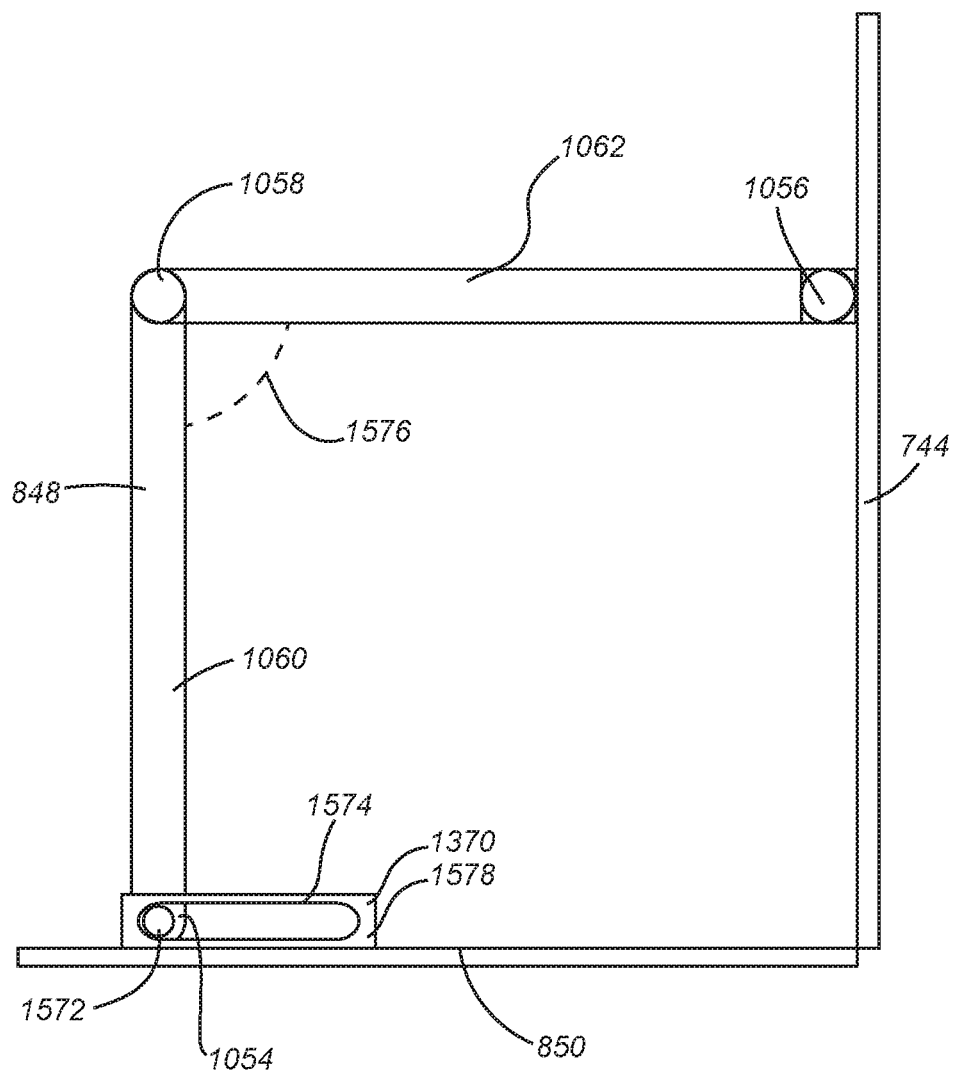
FIG. 15 is a schematic of a grill cart with the gas tank guard of FIG. 13 in accordance with various embodiments herein.

FIG. 13 shows a schematic of a gas tank guard 848 in a folded state in accordance with various embodiments herein. The gas tank guard 848 of FIGS. 13-15 is an alternate embodiment to the gas tank guard 848 of FIGS. 9-12. In FIG. 13 the back panel 744 is not shown for clarity. In some embodiments, the first end 1054 of the gas tank guard 848 can be coupled to the bottom surface via a slidable and rotatable coupling 1370. The first portion 1060 can be coupled to the second portion 1062 via a moveable or rotatable joint 1058.

FIG. 14 shows a schematic of the gas tank guard 848 shown in FIG. 13 in an upright state in accordance with various embodiments herein. In some embodiments, the first portion 1060 can be substantially parallel with the second portion 1062 in the folded state. In some embodiments, the first portion 1060 can be substantially perpendicular with the second portion 1062 in the upright state. In various embodiments, "substantially perpendicular" can refer to two components that are within 15 degrees of perpendicular, within 10 degrees of perpendicular, within 5 degrees of perpendicular, within 3 degrees of perpendicular, within 1 degree of perpendicular, or are perpendicular.

FIG. 15 shows a schematic of the grill cart 106 in the upright configuration with a gas tank guard 848 in accordance with various embodiments herein. In various embodiments, the bottom surface 850 and the back panel 744 can be configured at a right angle, the bottom surface 850 and the first portion 1060 can be configured at a right angle, the first portion 1060 and the second portion 1062 can be configured at a right angle, and the second portion 1062 and the back panel 744 can be configured at a right angle.

In some embodiments, the bottom surface 850 and the back panel 744 can be configured at a right angle. In various embodiments, the angle 1576 between the first portion 1060 and the bottom surface 850 can be at least 15° and not more than 165°. In various embodiments, the angle 1576 between the first portion 1060 and the bottom surface 850 can be at least 25° and not more than 155°. In various embodiments, the angle 1576 between the first portion 1060 and the bottom surface 850 can be at least 30° and not more than 105°. In various embodiments, the angle 1576 between the first portion 1060 and the bottom surface 850 can be at least 35° and not more than 145°. In various embodiments, the angle 1576 between the first portion 1060 and the bottom surface 850 can be at least 45° and not more than 135°. In various embodiments, the angle 1576 between the first portion 1060 and the bottom surface 850 can be at least 55° and not more than 125°. In various embodiments, the angle 1576 between the first portion 1060 and the bottom surface 850 can be at least 60° and not more than 120°. In various embodiments, the angle 1576 between the first portion 1060 and the bottom surface 850 can be at least 65° and not more than 115°. In various embodiments, the angle 1576 between the first portion 1060 and the bottom surface 850 can be at least 70° and not more than 110°. In various embodiments, the angle 1576 between the first portion 1060 and the bottom surface 850 can be at least 75° and not more than 105°. In various embodiments, the angle 1576 between the first portion 1060 and the bottom surface 850 can be at least 80° and not more than 100°. In various embodiments, the angle 1576 between the first portion 1060 and the bottom surface 850 can be at least 85° and not more than 95°.

As mentioned above, in some embodiments, the first end 1054 of the gas tank guard 848 can be coupled to the bottom surface via a slidable and rotatable coupling 1370. The coupling 1370 can include a projection 1572 which extends from the first end 1054 of the gas tank guard 848. The coupling 1370 can include a bracket 1578 which defines a slot 1574. The slot 1574 can have a longitudinal axis that extends parallel to an axis from the back panel 744 to the front panel 738. The projection 1572 can slide along the slot 1574 to change the position of the first end 1054 on the bottom surface 850. The projection 1572 can rotate within the slot 1574 to rotate a portion of the gas tank guard 848, such as while the grill cart 106 is transitioned from the folded state to the upright state. In some embodiments, in the upright state, the projection 1572 can be disposed at the end of the slot 1574 that is closest to the front panel 738. In some embodiments, in the folded state, the projection 1572 can be disposed at the end of the slot 1574 that is closest to the back panel 744.

Figure 16:
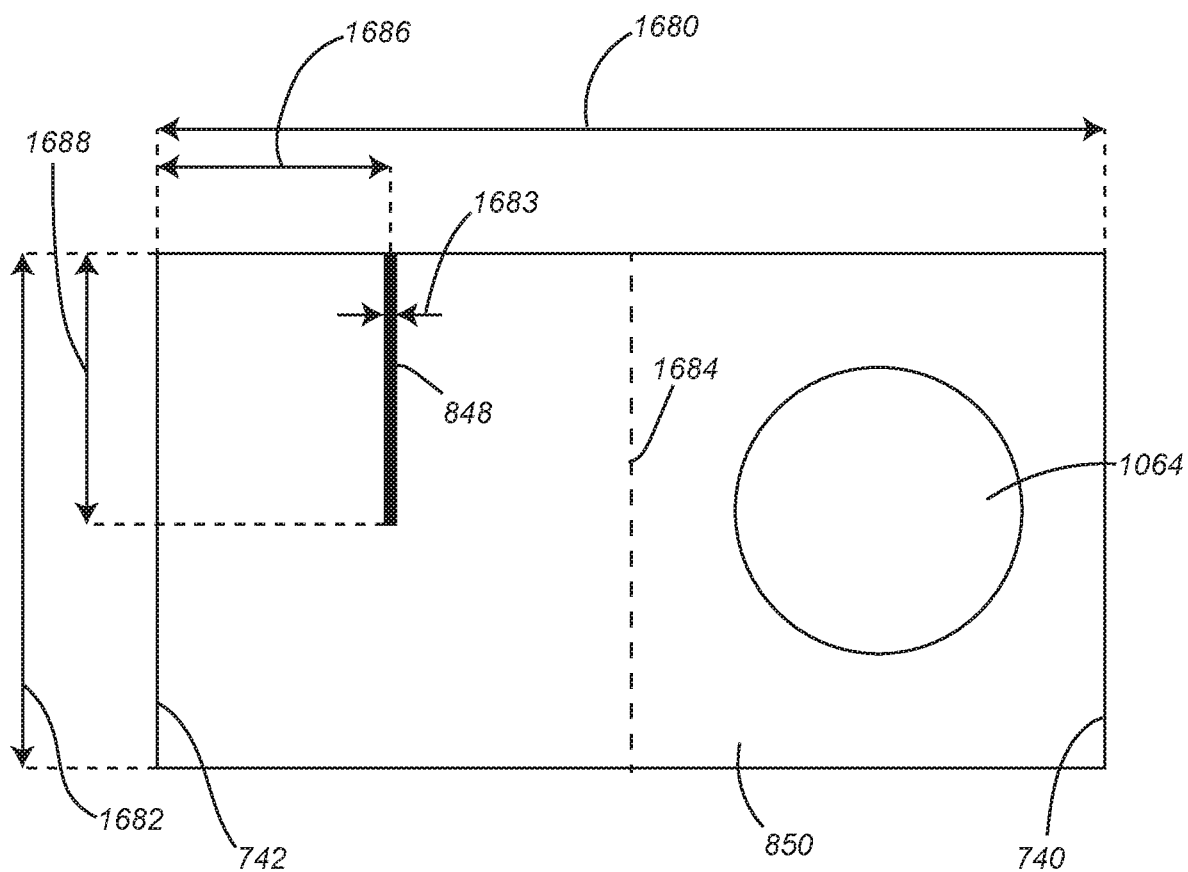
FIG. 16 is a schematic of a grill cart in accordance with various embodiments herein.

FIG. 16 shows a schematic top view of the bottom surface 850 of the grill cart in accordance with various embodiments herein. The bottom surface 850 can include a length 1680 and a width 1682. In various embodiments, the gas tank guard 848 can be disposed on the opposite side of a center line 1684 from the gas tank mount 1064. The gas tank guard 848 in the schematic drawing of FIG. 16 can be either the gas tank guard 848 of FIGS. 9-12 or the gas tank guard 848 of FIGS. 13-15.

In some embodiments, the length 1680 can be at least 25 inches and not more than 35 inches, such as 29 inches. In some embodiments, the width 1682 can be at least 15 inches and not more than 20 inches, such as 17.5 inches. In some embodiments, the gas tank guard 848 can have a thickness 1683 of at least 0.5 inches and not more than 3 inches, such as 0.75 inches.

In some embodiments, the gas tank guard 848 can be disposed at a distance 1686 that is at least 15% of the length 1680. In some embodiments, the gas tank guard 848 can be disposed at a distance 1686 that is at least 20% of the length 1680. In some embodiments, the gas tank guard 848 can be disposed at a distance 1686 that is at least 25% of the length 1680. In some embodiments, the gas tank guard 848 can be disposed at a distance 1686 that is at least 30% of the length 1680. In some embodiments, the gas tank guard 848 can be disposed at a distance 1686 that is at least 35% of the length 1680. In some embodiments, the gas tank guard 848 can be disposed at a distance 1686 that is at least 40% of the length 1680. In some embodiments, the gas tank guard 848 can be disposed at a distance 1686 that is at least 45% of the length 1680.

In various embodiments, the gas tank guard 848 can be disposed at a distance 1686 that is no more than 50% of the length 1680. In various embodiments, the gas tank guard 848 can be disposed at a distance 1686 that is no more than 45% of the length 1680. In various embodiments, the gas tank guard 848 can be disposed at a distance 1686 that is no more than 40% of the length 1680. In various embodiments, the gas tank guard 848 can be disposed at a distance 1686 that is no more than 35% of the length 1680. In various embodiments, the gas tank guard 848 can be disposed at a distance 1686 that is no more than 30% of the length 1680. In various embodiments, the gas tank guard 848 can be disposed at a distance 1686 that is no more than 25% of the length 1680. In various embodiments, the gas tank guard 848 can be disposed at a distance 1686 that is no more than 20% of the length 1680. In various embodiments, the gas tank guard 848 can be disposed at a distance 1686 that is no more than 15% of the length 1680.

It should be understood that the gas tank guard 848 can be disposed at a distance 1686 that is bounded between any of the minimum and maximum distances mentioned above. It should be further understood that the distance 1686 can be from the first side panel 740, such as when the gas tank mount 1064 is located closer to the second side panel 742.

In some embodiments, the gas tank guard 848 can extend a distance 1688 that is at least 25% of the width 1682. In some embodiments, the gas tank guard 848 can extend a distance 1688 that is at least 30% of the width 1682. In some embodiments, the gas tank guard 848 can extend a distance 1688 that is at least 35% of the width 1682. In some embodiments, the gas tank guard 848 can extend a distance 1688 that is at least 40% of the width 1682. In some embodiments, the gas tank guard 848 can extend a distance 1688 that is at least 45% of the width 1682. In some embodiments, the gas tank guard 848 can extend a distance 1688 that is at least 50% of the width 1682. In some embodiments, the gas tank guard 848 can extend a distance 1688 that is at least 55% of the width 1682. In some embodiments, the gas tank guard 848 can extend a distance 1688 that is at least 60% of the width 1682. In some embodiments, the gas tank guard 848 can extend a distance 1688 that is at least 65% of the width 1682. In some embodiments, the gas tank guard 848 can extend a distance 1688 that is at least 70% of the width 1682. In some embodiments, the gas tank guard 848 can extend a distance 1688 that is at least 75% of the width 1682. In some embodiments, the gas tank guard 848 can extend a distance 1688 that is at least 80% of the width 1682. In some embodiments, the gas tank guard 848 can extend a distance 1688 that is at least 85% of the width 1682. In some embodiments, the gas tank guard 848 can extend a distance 1686 that is at least 90% of the width 1682.

In some embodiments, the distance 1686 can be at least 5 inches and not more than 12 inches, such as 8⅜ inches. In some embodiments, the distance 1688 can be at least 5 inches and not more than 15 inches, such as 10 inches.

Methods

Figure 17:
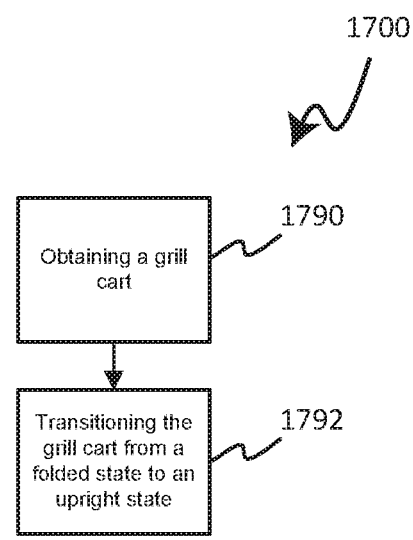
FIG. 17 is a flow chart depicting a method in accordance with various embodiments herein.

FIG. 17 shows a flow chart depicting a method 1700 of assembling a grill system in accordance with various embodiments herein. The method 1700 can include obtaining a grill cart, step 1790. In various embodiments, the grill cart can be in a folded position. The grill cart can include a bottom portion, a first side, a front side, a second side, a back side and a gas tank guard coupled to the grill cart within an interior volume defined by the grill cart. The gas tank guard can be in a first position while the grill cart is in the folded state.

In various embodiments, the method 1700 can further include transitioning the grill cart into an upright position, step 1792. The interior volume of the grill cart can be larger when the grill cart is in the upright state than the interior volume when the grill cart is in the folded state. Transitioning the grill cart into the upright position can include transitioning the gas tank guard into a second position. In various embodiments, the gas tank guard can be configured to prevent two or more gas tanks from being placed within the interior volume of the grill cart when the grill cart is in the upright state.

In some embodiments, the method 1700 can include coupling a burner box to the grill cart. In some embodiments, the method 1700 can include inserting a gas tank into the interior volume of the grill cart. In some embodiments, the method 1700 can include connecting the gas tank to the burner box with a tube, hose or pipe to facilitate the flow of gas from the gas tank to the burner box. In various embodiments, the gas tank guard can be rotatably coupled to at least two of: the bottom portion, the first side, the second side, the front side, and the back side.

Figure 18:
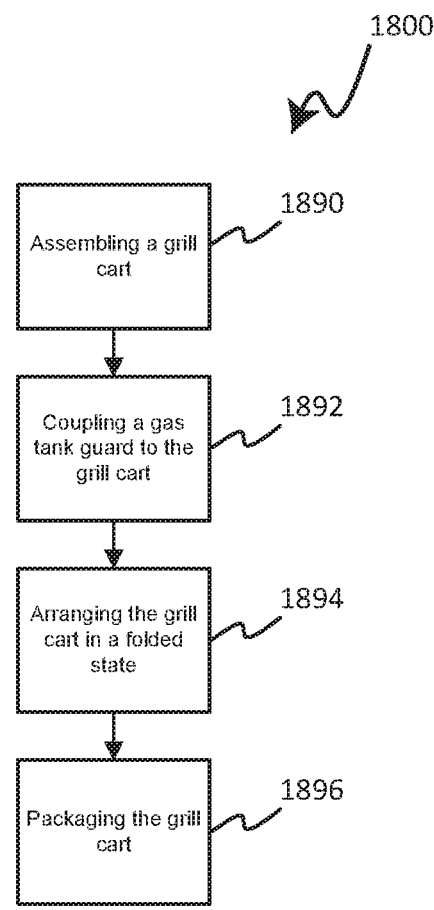
FIG. 18 is a flow chart depicting a method in accordance with various embodiments herein.

FIG. 18 shows a flow chart depicting a method 1800 of manufacturing a grill system in accordance with various embodiments herein. The method 1800 can include assembling a grill cart, step 1890. The grill cart can include a bottom portion, a first side, a second side, a front side, and a back side. The grill cart is configured to be transitioned between a folded state and an upright state.

In some embodiments, the method 1800 can include coupling a gas tank guard to the grill cart, step 1892. In some embodiments, the method 1800 can include arranging the grill cart into the folded state, step 1894. In some embodiments, the method 1800 can include packaging the grill cart in a folded state into a shipping container, step 1896. In some embodiments, the shipping container is a cardboard box. In some embodiments, the method 1800 can include adding identification information to a portion of the grill.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A grill system, comprising:
    a grill assembly comprising a grill cart and a burner box, wherein the burner box is coupled to a top portion of the grill cart; and
    a gas tank guard coupled to the grill cart;
    wherein the grill cart is transitionable between a folded state and a upright state, the grill cart defining an interior volume, wherein the interior volume is greater when the grill cart is in the upright state than when the grill cart is in the folded state;
    wherein the gas tank guard is configured to prevent two or more gas tanks from being placed within the interior volume of the grill cart when the grill cart is in the upright state;
    wherein the gas tank guard is coupled to the grill cart in both the folded state and the upright state;
    wherein the grill cart comprises a bottom portion, a first side, a front side, a second side, and a back side;
    wherein a first end of the gas tank guard is rotatably coupled to the bottom portion of the grill cart and a second end of the gas tank guard is rotatably coupled to one of the first side, the front side, the second side, or the back side of the grill cart;
    wherein in the upright state, the second end of the gas tank guard is located a distance away from the bottom portion of the grill cart.

2. The grill system of claim 1, wherein
    in the upright state, the second end of the gas tank guard is disposed above the bottom portion of the grill cart.

3. The grill system of claim 1, wherein the gas tank guard extends over at least 30% of the length of the bottom portion or over at least 30% of the width of the bottom portion.

4. The grill system of claim 1, wherein the gas tank guard comprises a first portion connected with a moveable joint to a second portion.

5. The grill system of claim 4, wherein the first portion and the second portion form an angle of at least 30° and not more than 105° when the grill cart is in the upright state.

6. The grill system of claim 4, wherein the first portion and the second portion form an angle within 15° of parallel when the grill cart is in the upright state.

7. The grill system of claim 1, wherein the gas tank guard is in a first position when the grill cart is in the folded state and in a second position when the grill cart is in the upright state.

8. The grill system of claim 1, wherein the interior volume of the grill cart in the folded state is less than 3 feet$^3$.

9. The grill system of claim 1, wherein the interior volume of the grill cart in the upright state is at least 8 feet$^3$ and not more than 115 feet$^3$.

10. The grill system of claim 1, wherein the gas tank guard is rigid or a flexible element that is taut when the grill cart is in the upright state.

11. The grill system of claim 1, wherein the gas tank guard comprises metal.

12. The grill system of claim 1, wherein the gas tank guard is disposed on the opposite side of a center line of the bottom portion of the grill cart from the gas tank mount.

13. A method of assembling a grill system, comprising:
    obtaining a grill cart, wherein the grill cart is in a folded position, wherein the grill cart comprises a bottom portion, a first side, a front side, a second side, a back side and a gas tank guard coupled to the grill cart within an interior volume defined by the grill cart; wherein the gas tank guard is in a first position; wherein a first end of the gas tank guard is rotatably coupled to the bottom portion of the grill cart and a second end of the gas tank guard is rotatably coupled to one of the first side, the front side, the second side, or the back side of the grill cart;
    transitioning the grill cart into an upright state from the folded state; wherein the interior volume is larger when the grill cart is in the upright state than the interior volume when the grill cart is in the folded state; wherein the gas tank guard is transitioned into a second position; wherein in the second position, the gas tank guard is configured to prevent two or more gas tanks from being placed within the interior volume of the grill cart and the second end of the gas tank guard is located a distance away from the bottom portion of the grill cart and coupling a burner box to a top portion of the grill cart to form a grill assembly.

14. The method of assembling a grill system of claim 13, further comprising:

inserting a gas tank into the interior volume of the grill cart.

15. The method of assembling a grill system of claim 14, further comprising:

connecting the gas tank to the burner box with a tube to facilitate the flow of gas from the gas tank to the burner box.

* * * * *